United States Patent Office 3,379,693
Patented Apr. 23, 1968

3,379,693
CARBONATE COMPOSITIONS
Fritz Hostettler and Eugene F. Cox, Charleston, W. Va., assignors to Union Carbide Corporation, a corporation of New York
No Drawing. Filed May 28, 1964, Ser. No. 371,073
24 Claims. (Cl. 260—77.5)

ABSTRACT OF THE DISCLOSURE

This specification discloses hydroxy products and a process for producing the same, which process comprises heating at least one cyclic carbonate, or an admixture containing a cyclic carbonate and a cyclic etser, with at least one organic functional initiator to a temperature in the range of from about 50° C. to about 225° C., the molar ration of said cyclic carbonate, or said admixture, to said initiator being at least about 2 to 1. Acylated or etherified products are suitable as plasticizers for vinyl resins and vinylidene resins. The hydroxy products may also be reacted with organic polyisocyanates to form urethane materials which are useful as printing ink rollers, cast solid urethane tires, mechanical goods such as seals, O-rings, gears or ladies' shoe heels.

---

This invention relates to novel carbonate compositions and processes for preparing the same. In one aspect, the invention relates to novel urethane carbonate compositions. In various other aspects, the invention relates to the preparation of cast resins, thermoplastic resins, millable gum stocks, etc., from novel carbonate compositions.

Broadly, the novel carbonate compositions which are contemplated are prepared by the polymerization reaction of an admixture containing a cyclic carbonate and an initiator in the presence or absence of a catalyst to form polycarbonates of widely varying and readily controllable molecular weights. The polymerization is initiated by reaction with one or more compounds having at least one reactive hydrogen capable, with or without the aid of a catalyst, of opening the cyclic carbonate ring and adding it as an open chain without forming water of condensation. Compounds that are suitable for initiating the polymerization, and therefore referred to herein as initiators, include monofunctional initiators such as alcohols, amines, and monocarboxylic acids, and polyfunctional initiators such as polyols, polyamines, amino alcohols, and vinyl polymers, as well as amides, sulfonamides, hydrazones, semi-carbazones, oximes, polycarboxylic acids, hydroxy carboxylic acids and aminocarboxylic acids.

The cyclic carbonate(s) used as starting material in the aforesaid polymerization reaction are those which are free from ethylenic and acetylenic unsaturation. The cyclic carbonates are characterized in that they contain at least 6 atoms (and upwards to 21 atoms), preferably 6 atoms, in the ring nucleus which possesses the carbonate group, i.e.,

and especially, those in which the ring nucleus is composed of carbon and oxygen, said oxygen being present in the form of the carbonate group,

Etheric oxygen can also be present in said nucleus. The cyclic carbonate monomers are further characterized in that they contain no more than four substituents or groups bonded to the carbon atoms of the ring nucleus which contains the carbonate group. In a preferred aspect, these cyclic carbonate monomers are characterized in that (a) they possess the 1,3-dioxane-2-one nucleus, (b) they contain no more than 3 substituents bonded to the carbon atoms of said nucleus, and (c) both ring carbon atoms which are alpha to the oxygen atoms of the carbonate group contain no more than one substituent on each of said carbon atoms. The cyclic carbonate monomers which are composed of (1) carbon, hydrogen, and oxygen atoms, or (2) carbon, hydrogen, oxygen, and nitrogen atoms, said nitrogen atom being in the form of nitro, tertiary amino, cyanoalkoxymethyl, or cyanoalkyl (—RCN) groups represent further preferred classes. In this respect, the oxygen is always present in the form of the carbonate group,

and etheric oxygen (—O—), esteric oxygen

and/or nitro oxygen (—$NO_2$) may also be present in the carbonate molecule.

Among the exemplary cyclic carbonate compounds are those depicted by the following formula:

I
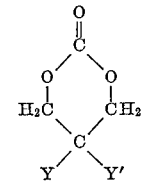

wherein Y and Y′ are monovalent groups which are free of ethylenic and acetylenic unsaturation. To further illustrate these monovalent groups, Y can be hydrocarbyl, e.g., alkyl, aralkyl, and the like; hydrocarbyloxymethyl, e.g., alkoxymethyl, aralkoxymethyl, and the like; acyloxymethyl, e.g., alkanoyloxymethyl, and the like; nitro (—$NO_2$); and the unit

each $R_1$ being hydrocarbyl, that is, a monovalent hydrocarbon radical such as alkyl, and the like; Y′ can be hydrocarbyl, e.g., alkyl, aralkyl, and the like; hydrocarbyloxymethyl, e.g., alkoxymethyl, aralkoxymethyl, and the like; and acyloxymethyl, e.g., alkanoyloxymethyl, and the like.

With reference to Formula I above, illustrative Y′ radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the alkoxymethyls, preferably the lower alkoxymethyls, e.g., methoxymethyl, ethoxymethyl, propoxymethyl, n-butoxymethyl, t-butoxymethyl, isobutoxymethyl, 2-ethylhexoxymethyl, decoxymethyl, and the like; the acyloxymethyls, e.g., ethanoyloxymethyl, propanoyloxymethyl, butanoyloxymethyl, hexanoyloxymethyl, octanoyloxymethyl, and the like.

With further reference to Formula I supra, illustrative Y radicals include (in addition to the aforementioned Y′ radicals), the dialkylaminos, preferably the lower dialkylaminos, e.g., dimethylamino, diethylamino, diisopropylamino, di-n-butylamino, di-sec-butylamino, di-t-butylamino, diisobutylamino, and the like. It is pointed out at this time that the terms a "lower alkyl" radical or a "lower alkoxy" radical as used herein, includes those radicals which contain from 1 to 6 carbon atoms therein. It is further preferred that the Y and Y' radicals, individually, contain no more than 12 carbon atoms each.

Exemplary classes of cyclic carbonate compounds include 4-nitro-4-alkanoyloxymethyl-2,6-dioxacyclohexanone,
4-dialkylamino-4-alkanoyloxymethyl-2,6-dioxyacyclohexanone,
4-nitro-4-alkoxymethyl-2,6-dioxacyclohexanone,
4-dialkylamino-4-alkoxymethyl-2,6-dioxacyclohexanone,
4-nitro-4-alkyl-2,6-dioxacyclohexanone,
4-alkyl-4-alkyloxymethyl-2,6-dioxacyclohexanone,
4,4-dialkyl-2,6-dioxacyclohexanone,
4,4-di(alkoxymethyl)-2,6-dioxacyclohexanone,
4,4-di(alkanoyloxymethyl)-2,6-dioxacyclohexanone, and the like.

Specific examples of the cyclic carbonate compounds include, for instance, 4-nitro-4-methoxymethyl-2,6-dioxacyclohexanone,
4-nitro-4-propoxymethyl-2,6-dioxacyclohexanone,
4-nitro-4-butoxyoxymethyl-2,6-dioxacyclohexanone,
4-diethylamino-4-methoxymethyl-2,6-dioxacyclohexanone,
4-nitro-4-propyl-2,6-dioxacyclohexanone,
4-nitro-4-n-butyl-2,6-dioxacyclohexanone,
4-nitro-4-propanoyloxymethyl-2,6-dioxacyclohexanone,
4-nitro-4-butanoyloxymethyl-2,6-dioxacyclohexanone,
4-methyl-4-ethyl-2,6-dioxacyclohexanone,
4,4-diethyl-2,6-dioxacyclohexanone,
4-isopropyl-4-ethyl-2,6-dioxacyclohexanone,
4-methyl-4-ethoxymethyl-2,6-dioxacyclohexanone,
4-methyl-4-propoxymethyl-2,6-dioxacyclohexanone,
4-ethyl-4-propoxymethyl-2,6-dioxacyclohexanone,
4-ethyl-4-butoxymethyl-2,6-dioxacyclohexanone,
4,4-dimethyl-2,6-dioxacyclohexanone,
4,4-di-n-butyl-2,6-dioxacyclohexanone,
4,4-di(propoxymethyl)-2,6-dioxacyclohexanone,
4,4-di(butoxymethyl)-2,6-dioxacyclohexanone,
4,4-di(propanoyloxymethyl)-,6-dioxacyclohexanone, and the like.

Further illustrative cyclic carbonates which are contemplated in the aforementioned polymerization reaction include, for instance, the mono-, di- and/or trihydrocarbyl substituted 2,6-dioxacyclohexanones such as 3- and/or 4- and/or 5-alkyl-2,6-dioxacyclohexanones and the 3- and/or 4- and/or 5-aralkyl-2,6-dioxacyclohexanone, e.g., 3- and/or 4-methyl-2,6-dioxacyclohexanone, 3- and/or 4-ethyl-2,6-dioxacyclohexanone, 3- and/or 4-propyl-2,6-dioxacyclohexanone, 3- and/or 4-isopropyl-2,6-dioxacyclohexanone, 3- and/or 4-n-butyl-2,6-dioxacyclohexanone, 3- and/or 4-isobutyl-2,6-dioxacyclohexanone, 3- and/or 4-t-butyl-2,6-dioxacyclohexanone, and the like; the 2,4,5-tri(lower alkyl)-2,6-dioxacyclohexanone, e.g., 3, 4,5-trimethyl-2,6-dioxacyclohexanone, 3,4,5-triethyl-2,6-dioxacyclohexanone, and the like; the polymethylene carbonates which have at least 6 atoms in the ring nucleus which contains the carbonate group, e.g., trimethylene carbonate, decamethylene carbonate undecamethylene carbonate, dodecamethylene carbonate, tridecamethylene carbonate, octadecamethylene carbonate, and the like; the polyoxyalkylene carbonates, e.g., triethylene glycol carbonate, tetraethylene glycol carbonate, and the like; and the 4,4-di(halomethyl)-2,6-dioxacyclohexanone.

Alcohols that are useful as monofunctional initiators include those organic compounds which contain an alcoholic hydroxyl group (—OH), for instance, monohydric alcohols such as methanol, ethanol, propanol, isopropanol, 1-butanol, allyl alcohol, 2-butanol, tert-butanol, 3-butenol, 1-pentanol, 3-pentanol, 1-hexanol, hex-5-en-1-ol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7 - ethyl - 2 - methyl-4-undecanol, 3,9-triethyl-6-decanol, lauryl alcohol, benzyl alcohol, phenyl methyl carbinol, cyclohexanol, cyclopentanol, cycloheptanol, and trimethylcyclohexanol. Further alcohols contemplated include the monoesterified diols such as those prepared by the reaction of equimolar amounts of an organic monocarboxylic acid, ester, or acyl halide, with a diol such as alkylene glycols, poly(alkylene glycols), mono- and polyether diols, mono- and polyester diols, etc., e.g.,

wherein

is acyl and R' is a divalent organic radical containing at least two carbon atoms in the divalent chain; the monoetherified diols such as those represented by the formula R₁OR'OH wherein R₁ represents a hydrocarbyl or oxahydrocarbyl radical and R' has the aforesaid value; the mono-ols produced by the partial esterification reaction of a polyol containing at least three hydroxyl groups, e.g., glycerine, with a molar deficiency of an organic carboxylic acid, ester, or acyl halide, and the like. The aforesaid reactions are well documented in the literature.

Illustrative amines that are useful as monofunctional initiators include primary and secondary amines, e.g., organic amines which contain the —NH₂ group or the —NRH group, R being hydrocarbyl such as alkyl, aryl, cycloalkyl, alkaryl, aralkyl, etc., as illustrated by the methyl-, ethyl-, n-propyl-, isopropyl-, n-butyl-, sec-butyl-, isobutyl-, tert-butyl-, n-amyl-, n-hexyl-, and 2-ethylhexyl-amines, as well as the corresponding dialkylamines; the aromatic amines such as aniline ortho-toluidine, meta-toluidine, and the like; the cycloaliphatic amines such as cyclohexylamine, dicyclohexylamine, and the like; and heterocyclic amines such as pyrrolidine, piperidine, morpholine and the like.

Illustrative of the monocarboxylic acids include those organic compounds which contain a sole carboxyl group (—COOH) as exemplified by the alkanoic acids, the cycloalkanecarboxylic acids, the monoesterified dicarboxylic acids, e.g.,

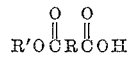

wherein R' is hydrocarbyl and R is the divalent residue of a dicarboxylic acid after removal of the two dicarboxylic groups, etc. Specific examples include propionic acid, butyric acid, valeric acid, dodecanoic acid, acrylic acid, cyclohexanecarboxylic acid, the mono-2-ethylhexyl ester of adipic acid, and the like.

Among the polyols which are encompassed as polyfunctional initiators are those organic compounds which contain at least two alcoholic hydroxyl groups such as the diols of the formula HO—R—OH wherein R is a substituted or unsubstituted alkylene radical or a substituted or unsubstituted (alkyleneoxy)ₙalkylene radical and wherein n is at least one. Of course, R has at least two carbon atoms in the alkylene chain, and the substituents or pendant groups on said R can be lower alkyl, halo, lower alkoxy, etc., such as methyl, ethyl, n-propyl, isopropyl, chloro, methoxy, ethoxy, and the like. Illustrative diols include ethylene glycol; propylene glycol; butylene glycol; diethylene glycol; dipropylene glycol; 2,2-dimethyl - 1,3-propanediol; 2-butene-1,4-diol; 2,2-diethyl-1,3-propanediol; 3 - methyl-1,5-pentanediol; the N-methyl- and N-ethyldiethanolamines; the various cyclohexanediols; 4,4'-methylenebiscyclohexanol; 4,4'-isopropylidenebiscyclohexanol; the ortho-, meta-, and para-xylene glycols; the hydroxymethyl substituted phenethyl alcohols; the ortho-, meta-, and para-hydroxymethyl phenylpropanols; the various phenylenediethanols; the various phenylenedipropanols; the various heterocyclic diols such as 1,4 - piperazinediethanol; and the like. Polyester polyols prepared by the reaction of a dicarboxylic acid, its diester, or dihalide with a molar excess of a diol are likewise suitable, e.g., the reaction of one mol of adipic acid with 2 mols of ethylene glycol.

Other suitable hydroxyl-containing initiators include polyoxyalkylated derivatives of mono- and polyfunctional compounds having at least one reactive hydrogen atom. These functional compounds may contain primary or secondary hydroxyls, phenolic hydroxyls, primary or secondary amino groups, amido, hydrazino, guanido, ureido, mercapto, sulfino, sulfonamide, or carboxyl groups. They are obtained by reacting, for example, monohydric compounds such as aliphatic and cycloaliphatic alcohols, e.g., alkanol, alkenol, methanol, ethanol, allyl alcohol, 3-buten-1-ol, 2-ethyl-hexanol, etc.; diols of the class HO(R)$_n$OH and HO(RORO)$_n$H wherein R is alkylene of 2 to 4 carbon atoms and wherein $n$ equals 1 to 10 such as ethylene glycol, propylene glycol, diethylene glycol, dipropylene glycol, and the like; thiodiethanol; the xylenediols, 4,4' - methylenediphenol, 4,4'-isopropylidenediphenol, resorcinol; and the like; the mercapto alcohols such as mercaptoethanol; the dibasic acids such as maleic, succinic, glutaric, adipic, pimelic, sebacic, phthalic, tetrahydrophthalic, and hexahydrophthalic acids; phosphorous acid; the aliphatic, aromatic, and cycloaliphatic primary monoamines, like methylamine, ethylamine, propylamine, butylamine, aniline, and cyclohexylamine; the secondary diamines like N,N'-dimethylethylenediamine; and the amino alcohols containing a secondary amino group such as N-methylethanolamine; with vicinal monoepoxides as exemplified by ethylene oxide, 1,2 - epoxypropane, 1,2-epoxybutane, 2,3-epoxybutane, isobutylene oxide, butadiene monoxide, allyl glycidyl ether, 1,2-epoxyoctene-7, styrene oxide, and mixtures thereof.

The preparation of the above exemplified polyoxyalkylated derivatives suitable for the preparation of the novel carbonates is illustrated by the reaction of 1,4-butanediol with ethylene oxide:

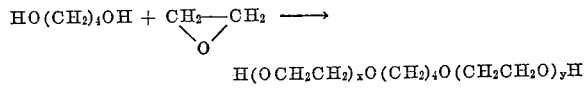

wherein $x+y$ equals, for example, one to forty.

Other useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides; or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction. Among suitable monoepoxides for preparing such polymers are tetrahydrofuran, trimethylene oxide, propylene oxide, ethylene oxide, and mixtures thereof.

Higher functional alcohols suitable for initiating the polymerization of cyclic carbonates include the triols such as glycerol, 1,1,1-trimethylolpropane, 1,2,4-butanetriol, 1,2,6-hexanetriol, triethanolamine, triisopropanolamine, and the like; the tetrols such as erythritol, pentaerythritol, N,N,N',N'-tetrakis(2 - hydroxyethyl)ethylenediamine, N,N,N'N' - tetrakis(2-hydroxypropyl)ethylenediamine, and the like; the pentols; the hexols such as dipentaerythritol, sorbitol, and the like; the alkyl glycosides; the carbohydrates such as glucose, sucrose, starch, cellulose, and the like.

Also suitable as polyols are the polyoxyalkylated derivatives of polyfunctional compounds having three or more reactive hydrogen atoms as, for example, the reaction product of 1,1,1-trimethylolpropane with ethylene oxide in accordance with the reaction.

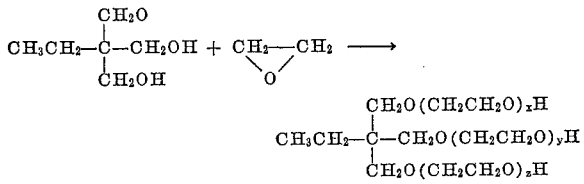

wherein $x+y+z$ equals 3 to 45, and more.

In addition to the polyoxyalkylated derivatives of trimethylolpropane, the following illustrative compounds are likewise suitable: glycerol; 1,2,4-butanetriol, 1,2,6-hexanetriol; erythritol; pentaerythritol; sorbitol; the methyl glycosides; glucose; sucrose; the diamines of the general formula H$_2$N(CH$_2$)$_n$NH$_2$, where $n$ equals 2 to 12; 2-(methylamino)ethylamine; the various phenylene- and toluenediamines; benzidine; 3,4' - dimethyl-4,4'-biphenyldiamine; 4,4' - methylenedianiline; 4,4',4''-methylidynetrianiline, the cycloaliphatic diamines such as 2,4-cyclohexanediamine, 1 - methyl-2,4-cyclohexanediamine, and the like; the amino alcohols of the general formula HO(CH$_2$)$_n$NH$_2$, where $n$ equals 2 to 10; the polyalkylene polyamines such as diethylenetriamine, triethylenetetramine, tetraethylenepentamine, and the like; the polycarboxylic acids such as citric acids, aconitic acid, mellitic acid, pyrolmellitic acid, and the like; and polyfunctional inorganic acids like phosphoric acid.

Difunctional amino alcohols capable of initiating the polymerization of cyclic carbonates include, for example, the alcohols of the general formula HO(CH$_2$)$_n$NH$_2$, where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alphamethylbenzyl alcohol, and the like; the various cycloaliphatic amino alcohols such as 4-aminocyclohexanol, and the like.

Higher functional amino alcohols having a total of at least three hydroxy and primary or secondary amino groups that are suitable include the dihydroxyalkylamines, e.g., diethanolamine, diisopropanolamine, and the like; 2-(2-aminoethylamino)ethanol; 2-amino-2-(hydroxymethyl)-1,3-propanediol; and the like.

Suitable diamines include aliphatic diamines of the general formula H$_2$N(CH$_2$)$_n$NH$_2$, monosecondary diamines of the general formula R''NH(CH$_2$)$_n$NH$_2$, and disecondary diamines of the general formula

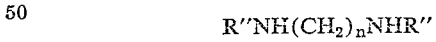

where $n$ equals 2 to 10, and more, and where R'' is alkyl, aryl, aralkyl, alkaryl, or cycloalkyl; the aromatic diamines such as metal-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4' - methylenedianiline, 4,4'-ethylenedianiline, 2,3,5,6-tetramethyl-para-phenylenediamine, 2,5-fluorenediamine, and 2,7-fluorenediamine; the cycloaliphatic diamines such as 1,4-cyclohexanediamine, 4,4'-methylenebiscyclohexylamine, and 4,4'-isopropylidenebiscyclohexylamine; and the heterocyclic amines such as piperazine, 2,5-dimethylpiperazine, 1,4-bis-(3-aminopropyl)piperazine, and the like.

Illustrative of the higher functional polyamines which can be employed as initiators include, for example, higher polyalkylene polyamines such as diethylenetriamine, triethylenetetramine, tetraethylenepentamine, dipropylenetriamine, tripropylenetetramine, tetrapropylenepentamine, and the like; 1,2,5-benzenetriamine, toluene-2,4,6-triamine; 4,4',4''-methylidynetrianiline; and the like; the polyamines obtained by interaction of aromatic monoamines with formaldehyde or other aldehydes, for example:

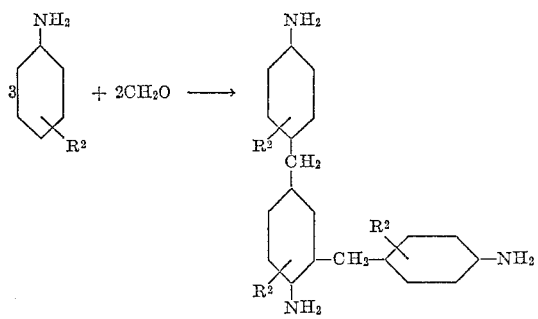

and other reaction products of the above general type, where $R^2$ is H or alkyl.

The cyclic carbonate will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

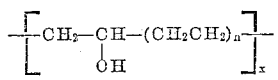

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene, 3-butene-1,2-diol, allyl alcohol, methallyl alcohol, 3-phenyl-3-butene-1-ol, and vinyl ethers like diethylene glycol monovinyl ether

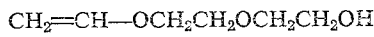

Representatives of the many polycarboxylic acids that are suitable as polyfunctional initiators are the aliphatic, cycloaliphatic, and aromatic dicarboxylic acids such as oxalic acid, succinic acid, maleic acid, glutaric acid, adipic acid, pimelic acid, suberic acid, azelaic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid, 4,4'-(ethylenedioxy)-dibenzoic acid, 4,4'-biphenyldicarboxylic acid, 4,4'-sulfonyl-dibenzoic acid, 4,4'-oxydibenzoic acid, the various tetrahydrophthalic acids, the various hexahydrophthalic acids, as well as higher functional acids such as tricarballylic acid, aconitic acid, citric acid, hemimellitic acid, trimellitic acid, trimesic acid, pyromellitic acid, 1,2,3,4-butanetetracarboxylic acid, and the like. Polycarboxy polyesters produced by the reaction of a sufficient molar excess of a polycarboxylic acid, e.g., adipic acid, with a polyol, e.g., diethylene glycol, are also suitable.

Suitable hydroxy- and aminocarboxylic acids include 2-hydroxypropionic acid, 6-hydroxycaproic acid, 11-hydroxyundecanoic acid, salicylic acid, para-hydroxybenzoic acid, beta-analine, 6-aminocaproic acid, 7-aminoheptanoic acid, 11-aminoundecanoic acid, and para-aminobenzoic acid.

In brief, therefore, the compounds which are extremely useful in initiating the polymerization reaction included the mono- and polycarboxy-containing initiators, the mono- and polyhydroxy-containing initiators, and/or the mono- and polyamino-containing initiators.

In an extremely preferred aspect, the novel carbonates which are contemplated are obtained via the polymerization of an admixture which contains at least one cyclic carbonate as illustrated supra, at least one initiator as illustrated supra, and at least one cyclic ester characterized by the following formula:

II
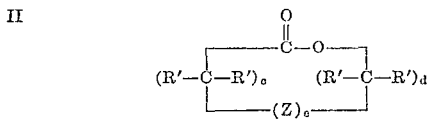

wherein each $R'$, individually, can be hydrogen, alkyl, halo, haloalkyl, alkoxyalkyl, alkoxy, and the like; wherein Z can be an oxy (—O—) group or a divalent saturated aliphatic hydrocarbon group of the formula

wherein the $R'$ variables have the same values as above; wherein $c$ is an integer of from 1 to 4, inclusive; wherein $d$ is an integer of from 1 to 4, inclusive; wherein $e$ is an integer having a value of zero or one; with the provisos that (a) the sum of $c+d+e$ cannot equal 3, (b) the total number of organic substituents (such as those described for the $R'$ variables) attached to the carbon atoms contained in the cyclic ester ring does not exceed 4, preferably does not exceed 3, and (c) the carbon atom which is adjacent to the oxy (—O—) group has at least one hydrogen substituent attached to said omega carbon atom.

With reference to Formula II supra, illustrative $R'$ radicals include, among others, methyl, ethyl, n-propyl, isopropyl, n-butyl, sec.-butyl, t-butyl, amyl, the hexyls, chloromethyl, chloroethyl, bromopropyl, bromobutyl, chloro, bromo, iodo, methoxymethyl, ethoxyethyl, propoxymethyl, butoxypropyl, methoxy, ethoxy, n-butoxy, isopentoxy, n-hexoxy, 2-ethylhexoxy, and the like. It is preferred that each $R'$, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. It is preferred that each $R'$, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve.

Representative monomeric cyclic esters which can be employed in the polymerization reaction include, for example, beta-propiolactone; delta-valerolactone; epsilon-caprolactone; 7-hydroxyheptanoic acid lactone; 8-hydroxyoctanoic acid lactone; the alpha, alpha-dialkyl-beta-propiolactones, e.g., alpha, alpha-dimethyl-beta-propiolactone, alpha, alpha-diethyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyldialkyl-, or trialkyl-epsilon-caprolactones, e.g., the monomethyl-, monoethyl-, monoisopropyl-, monohexyl-, mono-n-octyl-, dimethyl-, diethyl-, di-n-propyl, diisobutyl, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, dimethoxy-, diethoxy-, and dibutoxy-delta-valerolactones and epsilon-caprolactones, and the likke. Further illustrative cyclic esters include 3-ethyl-2-keto-1,4-dioxane, alpha, alpha-bis-(chloromethyl)propiolactone, 1,4-dioxane-2-one, 3-n-propyl-2-ketone-1,4-dioxane, and the like.

The polymerization reaction can be carried out in the absence of a catalyst though it is preferred to effect the reaction in the presence of an ester exchange catalyst. Among the catalysts suitable for this purpose are such metals as lithium, sodium, potassium, rubidium, caseium, magnesium, calcium, barium, strontium, zinc, titanium, cobalt, germanium, tin, lead, antimony, arsenic and cerium, as well as the alkoxides thereof. Additional suitable catalyst are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, and cobaltous acetate.

The organic titanium compounds that are especially suitable as catalysts because of their ability to promote the formation of virtually colorless polycarbonates in a short time are the titanates having the general formulae:

$$X_2TiO_3 \quad \text{and} \quad X_4TiO_4$$

in which the Xs are alkyl, aryl, or aralkyl, radicals, the alkyl titanates in which the Xs are lower alkyl radicals, particularly methyl, ethyl, propyl, isopropyl, butyl, isobutyl, tertiary butyl, amyl, isoamyl, etc., radicals, being preferred. Titanates that deserve special mention because of their efficiency in accelerating the reaction and producing virtually colorless polycarbonates are tetraisopropyl titanate and tetrabutyl titanate.

Additional highly preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates and metal acylates disclosed in U.S. 2,878,236 also represent further preferred catalysts which are contemplated. The disclosures of the aforesaid patents are incorporated by reference into this specification.

Acidic catalysts which can be employed in the polymerization reaction include, for example, the Lewis acids, preferably the metal halide Lewis acids, e.g., boron trifluoride, aluminum chloride, zinc chloride, stannic chloride, ferric chloride, boron trifluoride-piperidine complex, boron trifluoride-1,6-hexnaediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like;

The catalysts are employed in catalytically significant quantities. For optimum results, the particular catalyst employed, the nature of the monomeric reactant(s) and initiator, the operative conditions under which the polymerization reaction is conducted, and other factors, will largely determine the desirable catalyst concentration. In general, a catalyst concentration in the range of from about 0.0001 and lower, to about 3, and higher, weight percent, based on the weight of total monomeric feed, is suitable. A catalyst concentration in the range of from about 0.001 to about one weight percent is generally preferred.

The polymerization reaction is conducted at an elevated temperature. The maximum reaction temperature is realistically limited, to a significant degree by any tendency of the resulting polycarbonate products to be reverted back to the cyclic monomeric reactants. The use and concentration of a catalyst can also influence the reaction temperature. In general, a temperature in the range of from about 50° C., and lower, to about 225° C. is suitable; a range from about 100° C. to about 180° C. is preferred.

In general, the reaction time will vary depending upon the operative temperature, the nature of the monomeric reactant(s) and initiator employed, the particular catalyst and concentration employed, the use of an inert normally liquid organic vehicle, and other factors. The reaction time can vary from several minutes to several days depending upon the variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The polycarbonate polymeric products can be prepared via the bulk polymerization, suspension polymerization, or the solution polymerization routes. The polymerization reaction can be carried out in the presence of an inert normally-liquid organic vehicle.

The polymerization reaction can be executed in a batch, semi-continuous, or continuous fashion. The reaction vessel can be a glass vessel, steel autoclave, elongated metallic tube, or other equipment and material employed in the polymer art. The order of addition of catalyst and monomeric reactant(s) does not appear to be critical. Unreacted monomer, if any, can be removed from the resulting reaction product mixture by heating under reduced pressure, e.g., at about 130° C. under 1 to 5 mm. of Hg.

The polycarbonate products obtained in accordance with the aforesaid processes have molecular weights generally upwards of about 600, although molecular weights below and substantially above this figure are obtainable if desired, for example, as low as about 300 (corresponding to a hydroxyl number of 374) to as high as about 7000, and even higher still to about 9000. With reactive vinyl polymers as initiators, the average molecular weight of the polycarbonate products can easily go as high as 14,000, and higher. Generally, however, the molecular weight ranges from about 300 to about 9000, preferably from about 800 to about 4500. The polycarbonates have reactive terminal hydroxyl group(s), as explained hereinafter, the number of reactive terminal hydroxyl group(s) depending upon the functionality of the initiator.

The preparation of the polycarbonate products in accordance with the aforesaid methods has a number of outstanding advantages. One that is unique and of utmost importance is that with or without the cyclic ester as a co-reactant(s) and/or catalyst, the polycarbonate products are formed with reactive end groups that are not blocked to any significant extent by ester groups, chlorine, or the like. Another very important advantage is that no water of condensation is formed and that consequently for many applications the need for drying is obviated. In addition, the aforesaid methods have the advantage of permitting accurate control over the average molecular weight of the polycarbonate products and further of promoting the formation of a substantially homogeneous polycarbonate in which the molecular weights of the individual molecules are reasonably close to the average molecular weight, that is, a narrow molecular weight distribution is obtained. This control is accomplished by preselecting the molar proportions of cyclic carbonate, with or without cyclic ester, plus initiator in a manner that will readily be appreciated by those skilled in the art. Thus, for example, if it is desired to form a polycarbonate in which the average molecular weight is approximately fifteen times the molecular weight of the initial carbonate or carbonate mixtures, then the molar proportions of carbonate or carbonate mixture to initiator utilized in the polymerization reaction are fixed at approximately 15:1 inasmuch as it is to be expected that on the average each molecule of initiator will add on an approximately equal number of carbonates and an average of fifteen carbonate molecules would be available to each molecule of initiator. In general, one can employ at least about two mols of cyclic carbonate(s), or at least about two mols of an admixture containing cyclic carbonate(s) and cyclic ester(s), per mol of organic initiator. It is desirable, however, to employ an admixture containing cyclic carbonate(s), initiator(s), with/without cyclic ester(s) so that there is provided a ratio of at least about two cyclic carbonate molecules (or two molecules from a cyclic carbonate-cyclic ester admixture) for each reactive hydrogen substituent, e.g., hydroxyl, primary amino, secondary amino, carboxyl, etc., on said initiator. In different language, it is desirable to employ amounts of the aforesaid cyclic compound(s) and initiator(s) so that there is provided a ratio of at least about two mols of the aforesaid cyclic compound per mol of the aforesaid illustrative reactive hydrogen substituent on said initiator. The upper limit re the molar proportion is readily fixed by the particular average molecular weight polycarbonate product that is desired.

Though not to be bound by theory or reaction mechanism, a hydroxyl or amino-containing initiator is believed to open the cyclic carbonate ring to produce a carbonate linkage or a urethane linkage (depending on the functionality of the initiator) having one or more terminal groups that are capable of opening further cyclic carbonate rings and thereby adding more and more cyclic carbonate to the growing molecule. Thus, for example, the polymerization of an admixture of 4-4-dimethyl-2,6-dioxacyclohexanone and an aliphatic alcohol initiator (ROH) at a mol ratio of $x$ mols of the carbonate per mol of the initiator would take place as follows:

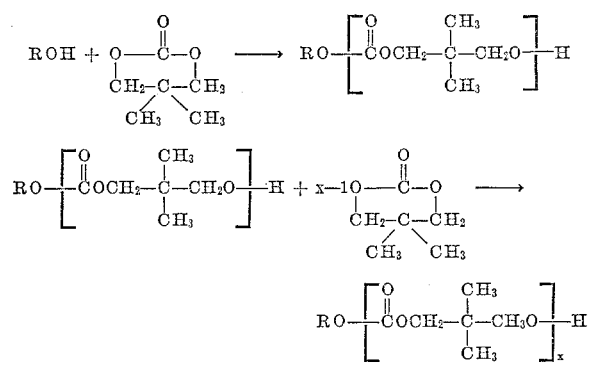

and wherein R (of the initiator and the resulting polycarbonate product) is an organic radical which can be an aliphatic, cycloaliphatic, aromatic, or heterocyclic radical.

In similar fashion, a monofunctional amine initiator (RNH$_2$ or R$_2$NH) opens and adds a succession of cyclic carbonate rings as shown below:

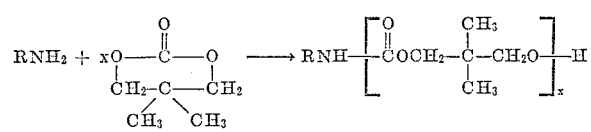

By way of a further illustration, the polymerization of the cyclic carbonate with a polyfunctional initiator, e.g., an amino alcohol (HORNH$_2$), is depicted below:

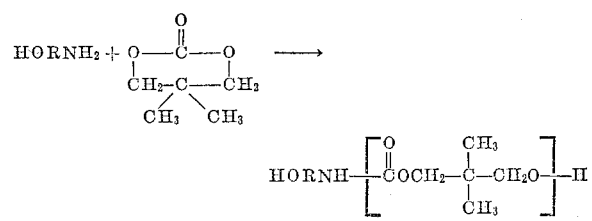

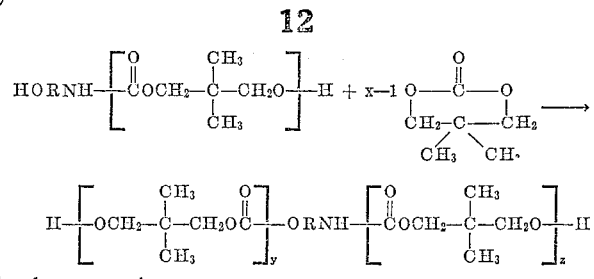

where $x=y+z$.

The polymerization reaction involving the cyclic carbonate with, for example, a polycarboxylic acid does not form polycarbonates which contain terminal carboxyl groups, i.e., the terminal group $$-OR'O\overset{O}{\underset{\|}{C}}OH$$

but rather, decarboxylation occurs during the polymerization reaction and the terminal group thus is hydroxyl, i.e., the terminal group —OR'OH. The following equation schematically illustrates a probable course of the reactions involved:

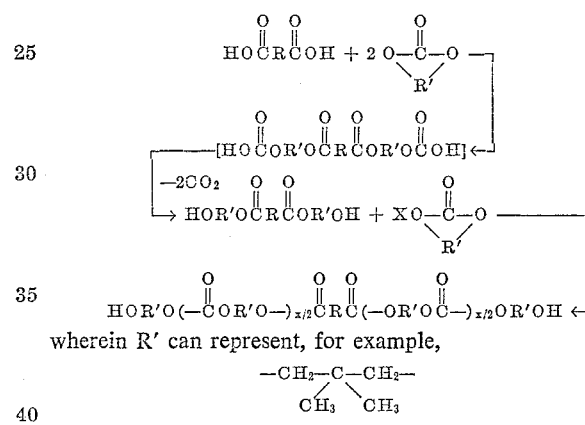

wherein R' can represent, for example,

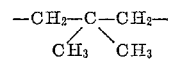

Furthermore, when the polymerization reaction involves a mixture of cyclic carbonate and cyclic ester (lactone) with, for example, a polycarboxylic acid, decarboxylation also occurs during the course of the reaction. The resulting polymer thus will be terminated by the unit —OR'OH (as illustrated previously) or the unit

wherein

is a linear lactone unit obtained by ring opening the corresponding lactone.

In summary, therefore, when a cyclic carbonate reacts with a functional group on the initiator such as (1) primary amino, —NH$_2$, (2) secondary amino, —NHR, (3) hydroxyl, —OH, or (4) carboxyl, —COOH, then the corresponding linkages which results from the aforesaid reactions are (1) a urethane group,

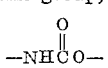

(2) a substituted urethane group,

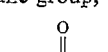

(3) a carbonate group,

or (4) an ester group,

respectively. The corresponding end groups of the products which result from the aforesaid reactions, if terminated by an essentially linear carbonate unit, are (1) hydroxyl, (2) hydroxyl, (3) hydroxyl, and (4) hydroxyl resulting from the decarboxylation of the unit

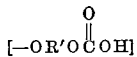

to the unit (—OR′OH), respectively.

The preceding discussion is to be compared with the reaction of a functional group on the initiator such as (1) primary amino, (2) secondary amino, (3) hydroxyl, or (4) carboxyl, with a cyclic ester (lactone) which may occur when one employs a mixture containing cyclic ester and cyclic carbonate. In these reactions, the corresponding linkages are (1) an amido group,

(2) a substituted amido group,

(3) an ester group,

or (4) an ester group,

respectively. The corresponding end groups of the products which result from these latter reactions, if terminated by an essentially linear lactone unit, are (1) hydroxyl, (2) hydroxyl, (3) hydroxyl, or (4) hydroxyl, respectively.

It is pointed out at this time that through the aforesaid equations supra have been exemplified by the common unit

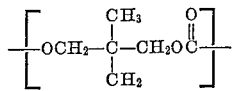

the generic unit can be obviously designated as

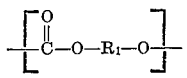

wherein $R_1$ represents a divalent aliphatic chain which contains at least 3 carbon atoms, and preferably 3 carbon atoms, and which is free from ethylenic and acetylenic unsaturation, said $R_1$ being monovalently bonded to both oxy atoms (—O—) in the aforesaid structural unit through carbon atoms, and further said $R_1$ containing no more than 4 substituents along the aliphatic chain. Accordingly, therefore, the term "polycarbonate" has been used in this specification including the appended claims to encompass those compounds which contain on the average, at least two

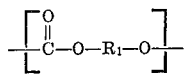

units such as those which result from the aforesaid reactions which involve a mixture containing a cyclic carbonate (with or without additional cyclic carbonate(s) and/or cyclic ester(s) and/or catalyst) plus an organic functional initiator. Furthermore, the term "polycarbonate" also encompasses those products which contain on the average, at least one

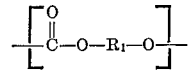

unit, and at least one

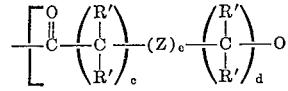

unit, wherein the variables R′, Z, c, d, and e have the values (and provisos) set forth in the discussion concerning Formula II supra. Lastly, the term "polymerization reaction(s) or process(es)" has been used as a matter of convenience to designate the aforesaid reactions of an admixture which contains at least one cyclic carbonate and at least one initiator.

Thus, from the foregoing discussion, the contemplated novel polycarbonates which result from the aforesaid polymerization reactions can be characterized as follows:

III 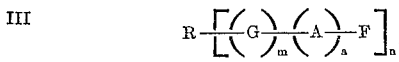

(1) wherein A represents at least one unit (IV) of the formula

IV 

$R_1$ representing a divalent aliphatic chain which contains at least three carbons therein, and which is free from ethylenic and acetylenic unsaturation, and $R_1$ being monovalently bonded to both oxy atoms (—O—) is the aforesaid unit through carbon atoms, and said $R_1$ containing no more than four substituents along the aliphatic chain; or wherein A represents, in addition to at least one unit IV supra, at least one unit V of the formula V 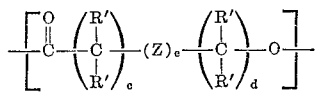

wherein each R′ is of the group consisting of hydrogen, alkyl, halo, haloalkyl, alkoxyalkyl, and alkoxy; wherein Z is of the group consisting of oxy and the unit

wherein $c$ is an integer of from 1 to 4; wherein $d$ is an integer of from 1 to 4; and wherein $e$ is an integer having a value of zero or one; (2) wherein the subscripts $a$ and $n$ are numbers, $n$ being at least one when $a$ averages at least two, and $n$ being at least two when $a$ averages at least one; (3) wherein $m$ is zero or one; (4) wherein R is the organic radical from the initiator (minus the involved functional group) such as an aliphatic, cycloaliphatic, aromatic, or heterocyclic radical; (5) wherein G is a divalent radical of the group consisting of —O—, —NH—, and —NR″—, said G being bonded to R and the carbonyl moiety of a unit defined in A above, R″ being a hydrocarbon radical such as alkyl, aryl, aralkyl, cycloalkyl, and alkaryl; and (6) wherein F is of the group consisting of hydrogen, acyl, or a monovalent hydrocarbon radical as defined supra; with the provisos (a) with reference to unit V supra, the sum of $c+d+e$ cannot equal three; (b) with reference to unit V supra, the R′ variables contained therein does not exceed three; and (c) with reference to unit V supra, the carbon atom adjacent to the oxy atom contains at least one hydrogen substituent thereon. It is understood, of course, that where a plurality of units as defined under the variable A in Formula III supra are linked together, such linkage is effected by monovalently bonding the oxy moiety of one unit to the carbonyl moiety of an adjacent unit (or vice-versa). In different language, the bonding between the units does not result in the

or —O—O— groupings. It is further readily appreciated that when $m$ is zero, then R is monovalently bonded to the carbonyl moiety of a unit defined in A.

With further reference to Formula III supra, it is readily apparent that $n$ is a number equal to the functionality of the initiator, i.e., at least one. Moreover, the subscript $a$ preferably is a number large enough to make the total average molecular weight of the polycarbonate at least about 300, more suitably at least about 600 and upwards to about 9000, and higher, and preferably from about 800 to about 4500. The number of A groups in the final polycarbonate will depend in large part upon the molar ratio of cyclic carbonate (or cyclic carbonate plus cyclic ester) to initiator as previously explained. As indicated previously, the F variable, in addition to being hydrogen can also be acyl or a hydrocarbon radical. As described below, the esterification or etherification of the reactive hydroxyl terminal group(s) of the polycarbonates results in converting said hydroxy group(s) to acyl or hydrocarbyl groups, respectively.

The esterification of one or more of the reactive hydroxyl terminal group(s) of the novel polycarbonates can be effected, by known reactions, with acids such as organic acids which contain one carboxyl group as exemplified by various aliphatic carboxylic acids such as the alkanoic acids, the cycloalkanecarboxylic acids, alkyl monoester of dicarboxylic acids, e.g., acetic acid, propionic acid, butyric acid, 2-ethylhexanoic acid, dodecanoic acid, 2-ethylhexyl monoester of adipic acid, etc., and various anhydrides of the formula $(RCO)_2O$ wherein each R is hydrocarbyl such as acetic anhydride, propionic anhydride, acetic butyric anhydride, etc. The etherification of one or more of the reactive hydroxyl terminated group(s) can be accomplished by procedures well documented in the literature such as by reaction of the novel polycarbonate with dihydrocarbyl sulfate (wherein hydrocarbyl is alkyl, cycloalkyl, aralkyl, etc.), e.g., dimethyl sulfate, diethyl sulfate, etc., in the presence of base, e.g., NaOH, thus yielding novel polycarbonates with hydrocarbyloxy terminal group(s), e.g., alkoxy, cycloalkoxy, etc. The acylated or etherified polycarbonates are admirably suitable as plasticizers for vinyl resins and vinylidene resins, e.g., polyvinyl chloride, polyvinylidene chloride, etc., since the water extractability of the resulting polycarbonate has been markedly reduced.

With reference to Formula III supra, particularly preferred novel polycarbonates are those in which Unit IV supra is VI 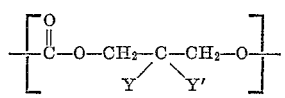

wherein Y and Y' have the values set out in Formula I supra.

In highly preferred aspects of the invention, Unit VI above is as follows:

VII 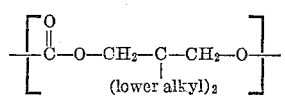

wherein each lower alkyl variable contains from 1 to 6 carbon atoms, preferably 1 to 2 carbon atoms, and preferably still each lower alkyl is methyl; and/or VIII 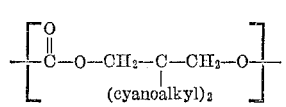

wherein each cyanoalkyl variable contains from 1 to 4 carbon atoms, and preferably wherein each cyanoalkyl variable is cyanomethyl; and/or IX 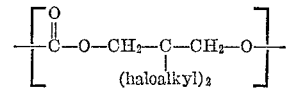

wherein each haloalkyl variable contains from 1 to 4 carbon atoms, and preferably wherein each haloalkyl variable is chloromethyl; and/or X 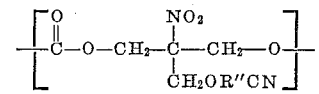

wherein R'' is alkylene, preferably alkylene of 2 to 4 carbon atoms, and preferably still R'' is ethylene $$(-CH_2CH_2-)$$

and/or

XI 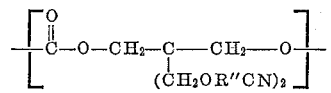

wherein each R'' has the meanings assigned in Unit X above.

With continued reference to Formula III above, the particularly preferred novel polycarbonates are those in which Unit V is XII 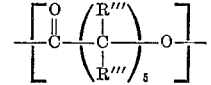

wherein each R''' is hydrogen or lower alkyl, preferably hydrogen or methyl, with the provisos that no more than 3 R''' variables are substituents other than hydrogen, and that the carbon atom adjacent to the oxy atom contains at least one hydrogen substituent thereon.

Referring further to Formula III supra, eminently preferred polycarbonates are those in which the variable $m$ equals one, in which $n$ is at least one, wherein F is hydrogen, and wherein said polycarbonate contains at least one unit designated as VII through XI supra and at least one Unit XII supra.

The proportions of each Unit IV and Unit V (as well as those preferred units encompassed therein) in the novel polycarbonates can be from about 3 to about 97 mol percent (based on the total mols of the appropriate monomers polymerized therein). It is preferred that the novel products under consideration contain from about 50 to about 5 mol percent, preferably still from about 40 to about 10 mol percent of Unit IV, and from about 50 to about 95 mol percent, and preferably still from about 60 to about 90 mol percent of Unit V characterized therein.

It is also within the scope of the invention to form other useful novel polycarbonates. Briefly, a molar excess (and up to 100 mols, and higher) of cyclic carbonate(s) or mixture comprising cyclic carbonate(s) and an epsilon-caprolactone(s) per mol of a glycol, a diamine, and/or an amino alcohol can be reacted together (the reactants and reaction conditions have been exemplified supra), to form hydroxyl-terminated polycarbonate which polycarbonate subsequently can be reacted at an elevated temperature, e.g., from about 125° C. and lower, to about 225° C., with a molar deficiency or a molar excess of a dicarboxylic acid such as those exemplified supra, to produce hydroxyl-terminated products or carboxyl-terminated products, as may be the case, to wit:

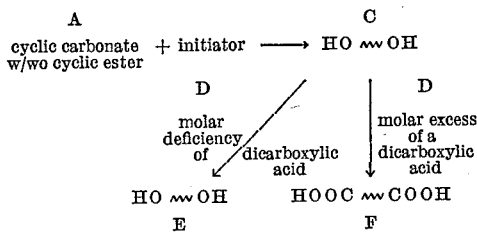

wherein A represents a cyclic carbonate or an admixture containing cyclic carbonate and an epsilon-caplolactone such as those illustrated previously; wherein B is a glycol, a diamine, or an amino alcohol such as those illustrated supra; wherein C is a hydroxyl-terminated polycarbonate which contains at least two Unit IV, or at least one Unit IV and at least one Unit XII which have been exemplified supra; wherein D is a dicarboxylic acid illustrated supra; wherein E is a hydroxyl-terminated polycarbonate which contains a plurality of Unit IV supra, e.g., at least four Unit IV (or at least two Unit IV plus at least two Unit XII), and contains at least one diacyl residue from the dicarboxylic acid, e.g.

and wherein F is a carboxyl-terminated polycarbonate which contains, as terminal units the unit

and in addition, at least two Unit IV, or at least one Unit IV and at least one Unit XII. The carboxyl-terminated polycarbonate F may also contain at least one diacyl residue

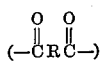

and preferably it contains a plurality of diacyl residues. The hydroxyl-terminated polycarbonates E can be readily esterified or acylated, as explained previously, with aliphatic carboxylic acids or anhydrides. The carboxyl-terminated polycarbonates F can be readily esterified in a known manner by reaction with monohydric alcohols such as the alkanols, the cycloalkanols, the monoalkyl ethers of glycols, etc., e.g., 2-ethyl-1-butanol, 1-hexanol, 2-ethyl-1-hexanol, 3-heptanol, 2-butyl-1-octanol, 2,6,8-trimethyl-4-nonanol, 5-ethyl-2-nonanol, 7-ethyl-2-methyl-4-undecanol, 3,9-diethyl - 6 - tridecanol, cyclohexanol, ethylene glycol monobutyl ether, ethylene glycol monoethyl ether, diethylene glycol monoethyl ether, and diethylene glycol monobutyl ether.

It is to be understood that the glycols which can be employed as the initiator B supra, encompass the hydroxyl-terminated polyesters which result from the reaction of a molar excess of a diol with a dicarboxylic acid, ester, or halide. The preparation of the aforesaid hydroxyl-terminated polyesters are well documented in the literature.

Additionally, it is pointed out that the glycols which can be employed as the initiator B supra, also include the hydroxyl-terminated reaction products which result from the reaction of a molar excess of an epsilon-caprolactone, zeta-enantholactone, or hydroxyoctanoic acid lactone with an initiator such as a diamine, diol, or amino alcohol, in the absence of a catalyst, or in the presence of a catalyst, as explained in U.S. 2,878,236 and U.S. 2,890,208. The aforesaid two patents as well as their description of the lactones, initiators, and reaction conditions are incorporated by reference into this disclosure.

It is further pointed out that the dicarboxylic acids D supra include within their scope the carboxyl-terminated reaction products which are prepared by the reaction of an epsilon-caprolactone with a dicarboxylic acid as detailed in the aforesaid two patents which have been incorporated by reference.

Also within the scope of the invention is the incorporation of a lactone (such as those exemplified above) into the dicarboxylic acid D, and using the resulting admixture as reactants to form the polycarbonates identified as E and F supra. The latter two modifications result in products E and F above which contain at least one and preferably a plurality of units identified as Unit V in Formula III supra with the excepttion that the sum of the variables $c+d+e$ equals 5 to 7 in said Unit V supra.

Other variations which are encompassed within the scope of the invention is the incorporation, with the initiator B, of a small quantity of triols, tetrols, pentol, hexols, etc., into the reaction mixture, providing the resulting polycarbonates E and F do not result in a cross-linked product. In addition to the dicarboxylic acid D, one can incorporate a small quantity of a higher polycarboxylic acid (tri-, tetra-, penta-, hexa-, etc.) into the reaction mixture so long as this resulting polycarbonate E or F is not a cross-linked product.

A convenient method of measuring the molecular weight of the polycarbonate is to determine the average number of carboxyl and hydroxyl in a given amount of the polycarbonate.

The acid number (milligrams of KOH per gram of polycarbonate using phenolphthalein as an indicator) is a measure of the number of terminal carboxyl groups in a polycarbontae. The hydroxyl number, which is a measure of the number of terminal hydroxyl groups and is defined in terms of milligrams of KOH per gram of polycarbonate, is determined by adding pyridine and acetic anhydride to the polycarbonate and titrating the acetic acid formed with KOH as described in Ind. Eng. Chem., Anal. Ed., vol. 16, pages 541–9 and in Ind. Eng. Chem., Anal. Ed., vol. 17, page 394. The sum of the acid or carboxyl number and the hydroxyl number, referred to as the reactive number, is an indication of the average number of terminal groups present in the polycarbonate and therefore is in turn an indication of the number of molecules in the mass and the degree of polymerization. The polycarbonate containing long chain molecules will have a relatively low reactive number while a polycarbonate containing short chain molecules will possess a relativey high reactive number.

In one embodiment, the invention is directed to the preparation of novel polyurethane polycarbonate diols which result from the reaction the novel polycarbonate diols encompassed within the scope of Formula III supra, with a molar deficiency of organic diisocyanates, in the essential absence of water. Equation XIII below illustrates the linear extension reaction involved:

XIII
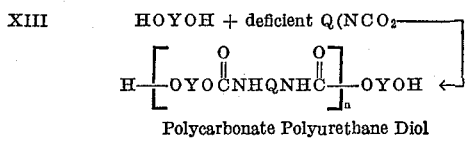
Polycarbonate Polyurethane Diol wherein HO(CAR)OH is an abbreviated representation for novel polycarbonate diols represented by the formula $R(G_m-A-F')_2$ wherein R, G, A, and m have the meanings set out in connection with Formula III supra; wherein F' is hydrogen; wherein n is a number having an average value of at least one; and wherein O is a divalent organic radical of the group consisting of divalent aliphatic, cycloaliphatic, aromatic, and heterocyclic radicals.

It will be noted from Equation XIII that the degree of linear extension is realistically controlled by the amount of diisocyanate employed. If the proportions of polycarbonate diol and diisocyanate are chosen so that the number of reactive hydroxyl groups on the polycarbonate are equal to the number of reactive isocyanate groups on the diisocyanate, then relatively long, high molecular weight chains may be formed. In general, one can employ such relative amounts so that there is provided at least a slight molar excess of polycarbonate diol per mol of diisocyanate. It is desirable, however, to employ amounts of polycarbonate diol and organic diisocyanate (in Formula VIII) so that there is provided a ratio of from about 1.1 to about 2 mols, and higher, of polycarbonate diol per mol of organic diisocyanate, and preferably from about 1.3 to about 1.7 mols of diol per mol of diisocyanate.

The reaction of the polycarbonate diol with the diisocyanate can take place at temperatures varying from room temperature to about 200° C. The preferred temperature is in the range of about 30° C. to about 125° C. A highly preferred temperature range is from about 60° C. to about 90° C. The upper limit of the reaction temperature is selected on the basis of the thermal stability of the reaction products and of the reactants whereas the lower limit is influenced, to a significant degree, by the rate of reaction.

The time of reaction may vary from several minutes to as much as a day depending upon the reaction temperature and the identity of the particular polycarbonate diol and diisocyanate as well as upon the absence or presence of accelerator or retarder and the identity thereof. Most desirably, conditions are adjusted so as to provide a controllable reaction that is completed, for example, in less than about two hours.

In a second embodiment, the invention is directed to the preparation of novel polycarbonate polyurethane diisocyanates which result from the reaction of the novel polycarbonate diols encompassed within the scope of Formula III supra, with a molar excess of organic diisocyanates, in the essential absence of water. Equation XIV below illustrates this linear extension reaction involved:

XIV    HOYOH + excess Q(NCO)₂ ⟶

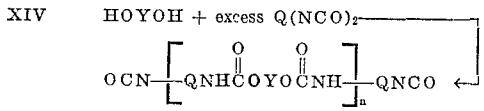

Polycarbonate Polyurethane Diisocyanate ("Prepolymer")

wherein all the variables of Equation XIV have the meanings set out in Equation XIII previously.

It will be noted from Equation XIV that the use of an excess of diisocyanate provides an efficient means of control over the degree of linear extension of the polycarbonatepolyurethane molecule. If the proportions of polycarbonate diol and diisocyanate are chosen so that the number of reactive terminal hydroxyl groups on the polycarbonate are equal to the number of reactive isocyanate groups on the diisocyanate, as indicated previously, relatively long, high molecular weight chains would be formed. It is desirable, for many applications, to employ amounts of diisocyanate and polycarbonate diol (in Formula XIV) so that there is provided a ratio of greater than about one mol of diisocyanate per mol of polycarbonate diol, preferably from about 1.2 to about 2.5 mols, and higher, of diisocyanate per mol of polycarbonate, and preferably still from about 1.3 to about 2 mols of diisocyanate per mol of polycarbonate.

If desired, the aforesaid hydroxyl-isocyanato reactions set forth in the preceding embodiments may be acelerated by employing well-known prior art catalysts. Among such catalysts can be included tertiary aliphatic and heterocyclic amines and many metallic catalysts such as tin, lead, iron, antimony, bismuth, cobalt, etc. Catalyst concentrations from about 0.0001 to about 0.5 weight percent, and higher, based on the weight of the total ingredients, have been found sufficient.

During and after preparation of the isocyanato-terminated reaction products it is, oftentimes, desirable to stabilize said reaction products by the addition of retarders to slow down subsequent further polymerization or less desirable side-reactions such as, for example, allophanate formation. Retarders may be added to the diisocyanate, polycarbonate diol, and/or the aforesaid reaction products. Among the retarders suitable for the polycarbonate-diisocyanate reaction are acids such as hydrochloric acid, sulfuric acid, phosphoric acid, boric acid, and organic acids; acyl halides such as acetyl chloride and acetyl bromide; sulfonyl halides such as para-toluenesulfonylchloride; inorganic acid halides like phosphorous tribromide, phosphorous trichloride, phosphorous oxychloride, sulfuryl chloride, and thionyl chloride; and sulfur dioxide or acidic sulfones.

If the starting polycarbonate diol contains alkaline reacting materials, it should be neutralized or acidified slightly by addition of acids or acid chlorides. For instance, polyalkylene oxides can be prepared by catalyzing the alkylene oxide polymerization with sodium or potassium hydroxide or other basic catalysts. If these polyalkylene oxides are employed as initiators for the carbonate polymerization, the resulting polyether-polycarbonate contains some sodium or potassium carboxylate end-groups which are efficient catalysts for the isocyanate reaction. In order to prevent almost instantaneous or premature cross-linking in stage two, the polyether-polycarbonate product should be neutralized or slightly acidified.

The reaction conditions which are employed in the linear extension reaction of the second embodiment are essentially similar to those set forth in the discussion of the polycarbonate polyurethane diols.

The chain lengthening reactions of the polycarbonate diols exemplified in the preceding embodiments can be carried out with a wide variety of aliphatic, cycloaliphatic or aromatic diisocyanates, the aromatic diisocyanates being most suitable because of their greater reactivity. Among the various diisocyanates useful in this reaction are m- and p-phenylene diisocyanates, 2,4- and 2,6-tolylene diisocyanates, 2,3,5,6-tetramethyl-para-phenylene diisocyanate, m-xylylene diisocyanate, p-xylylene diisocyanate, 4,4'-biphenylene diisocyanate, 3,3'-dimethyl-4,4'-biphenylene diisocyanate, 3,3'-dimethoxy-4,4'-biphenylene diisocyanate, p,p'-bibenzyl diisocyanate, p,p'-diphenylmethane diisocyanate, 4,4'-methylene bis ortho tolyl isocyanate, 1,5-naphthalene diisocyanate, fluorene diisocyanates, pyrene diisocyanates, chrysene diisocyanates, hexamethylene diisocyanate, etc. The table in the publication of Siefken (Annalen, 562, pages 122–135 (1949)), lists numerous other diisocyanates which are useful for performing these reactions.

If desired the above linear extension reactions can be carried out in the presence of essentially inert solvents, depending upon the further application which may be intended for said reaction products.

It is pointed out that the second embodiment also contemplates, in lieu of the novel polycarbonate diols encompassed within the scope of Formula III supra, but also the polycarbonate polyurethane diol reaction products which result from the reaction defined by Equation XIII supra.

A third embodiment of the invention is directed to the preparation of cast polyurethane systems. Highly useful thermoset, rigid to rubbery, polyurethane resins can be prepared by the reaction of the polycarbonate polyurethane diisocyanate reaction products of the second embodiment (hereinafter referred to as "prepolymer") with a polyfunctional chain extender which contains at least two functional groups that are primary amino (—NH₂), secondary amino (—NHR), hydroxyl (—OH), or mixtures thereof. The prepolymer and polyfunctional chain extender are employer in such relative amounts that there is provided at least about one equivalent (group) of isocyanate (—NCO) from the prepolymer per equivalent group) of functional group (hydroxyl and/or amino) from the polyfunctional compounds. When employing solely difunctional compounds as the chain extender(s), it is desirable to employ such relative amounts that result in greater than about one equivalent of —NCO, e.g., at least about 1.02 equivalent of —NCO, from the prepolymer per functional group from the difunctional compound. However, it is oftentimes highly satisfactory when employing polyfunctional chain extenders which contain 3 or more functional groups, alone or in admixture with difunctional chain extenders, to employ such relative amounts so that there is provided at least about one equivalent of —NCO from the prepolymer per equivalent of functional group from the chain extender(s). Cast polyurethane resins having special utility as printing ink rollers, cast solid urethane industrial tires, mechanical goods such as seals, O-rings, gears, etc., ladies shoe heels, and the like, can be prepared from castable formulations which provide from about 1.02 to about 1.3 equivalents of —NCO from the prepolymer per equivalent of functional group from the polyfunctional chain extender. Optimum properties result from the highly preferred castable formulations which provide from about 1.05 to about 1.2 equivalents of —NCO per equivalent of functional group.

It is further highly desirable that the aforesaid prepolymer have an average molecular weight of at least about 650 in the preparation of cast polyurethane resins. The upper limit can be as high as 8,000 and higher. For many applications, a practical molecular weight range is from about 750 to about 5000. It is observed that within the aforesaid molecular weight limits there can be produced cast polyurethane resins which vary from extremely soft rubbery products to relatively hard plastic products. To prepare the relatively soft rubbery products, it is oftentimes desirable to employ a prepolymer which has an average molecular weight in the range of from about 2500 to about 4000, and higher. On the other hand, the preparation of relatively hard plastic products is best achieved by the use of a prepolymer which has an average molecular weight below about 1200, and preferably below about 1000.

Among the polyfunctional chain extenders which can be employed in the castable formulations are those organic polyfunctional initiators exemplified previously which have two or more hydroxyl and amino (primary and secondary) groups including mixtures of such groups such as the polyols (diols, triols, tetrols, etc.), the polyamines (diamines, triamines, etc.), amino alcohols, and the like. Among the polyfunctional chain extenders which deserve special mention because they result in especially useful cast polyurethane resins of high strength, high tear resistance, relatively low permanent set, good solvent resistance, and/or excellent abrasion resistance can be listed the following: 1,4-butanediol, 1,5-pentanediol, 1,6-hexanediol, quinitol, 1,4 - bis(2 - hydroxyethoxy)benzene, 4,4' - bis [(2 - hydroxyethoxy)phenyl]isopropylidene, trimethylolpropane, triisopropanolamine, ethanolamine, p-aminophenylethyl alcohol, 2,4- and 2,6-toluenediamines, 3,3'-dichloro-4,4'-biphenylenediamine, and 4,4'-methylene bis (o-chloroaniline).

The preparation of the cast polyurethane products can take place over a wide temperature range, e.g., from about room temperature to about 200° C., and higher. The preferred temperature is in the range of from about 50° C. to about 150° C. A highly preferred temperature range is from about 90° C. to about 130° C. The upper limit of the reaction temperature, as indicated previously, is realistically controlled by the thermal stability of the reactants and reaction products whereas the lower limit is regulated, to a significant degree, by the reaction rate.

A valuable modification of the cast polyurethane embodiment is the use of an admixture containing novel polycarbonate diols (of Formula III) with/without the novel polycarbonate polyurethane diols (of Equation XIII) plus organic diisocyanates (such as those exemplified previously) instead of, or in conjunction with, the prepolymer (of Equation XIV). In this modification, the ratios of the equivalents of —NCO and the equivalents of functional groups are the same as set forth in the third embodiment. It is understood, of course, that these ratios will include all the —NCO groups and all the functional groups in the castable formulation regardless of the source. Thus, for example, if the formulation comprises novel polycarbonate diol, organic diisocyanate, and alkanediol, one must take into consideration when computing the equivalents ratio of said formulations, the equivalents of —NCO from the organic diisocyanate with relation to the sum of the equivalents of the hydroxyl groups from the polycarbonate diol plus alkanediol.

A fourth extremely significant embodiment is directed to the preparation of thermoplastic polyurethane resins including curable polyurethane systems. Such useful systems and/or resins can be prepared from formulations (which include the reactants, reaction conditions, and modifications thereof) as set out in the third embodiment with the exception that there is employed at least about one equivalent of functional group, e.g., hydroxyl, primary amino, secondary amino, or mixtures thereof, from the polyfunctional chain extender per equivalent of isocyanato (—NCO) from the isocyanate source. In general, a practical upper limit would be about 1.5 equivalents of functional group per equivalent of —NCO. Preferred formulations contain from about 1.02 to about 1.3 equivalents of functional group per equivalent of —NCO, and preferably still from about 1.05 to about 1.15 equivalents of functional group per equivalent of —NCO.

The thermoplastic and curable polyurethane resins can be cured or crosslinked with an organic polyisocyanate, preferably an aromatic polyisocyanate. While the polyisocyanate employed in this cure may, if desired, be the same as, or different than, those diisocyanates used in the preceding embodiments, it may also be a tri- or higher polyisocyanate such as those produced by the phosgenation of the reaction products of aniline and formaldehyde, or p,p',p''-triphenylmethane triisocyanate.

In general, the cure can be effected by using an amount of polyisocyanate which is in stoichiometric excess necessary to react with any free or unreacted functional group from the polyfunctional chain extender. In general, from about 1 to about 10 parts by weight of additional polyisocyanate per 100 parts by weight of curable polyurethane resin is adequate to accomplish the cure for most applications. A preferred range is from about 2.5 to about 6 parts by weight of polyisocyanate per 100 parts by weight of curable stock. The additional polyisocyanate can be admixed with the curable polyurethane stock on a conventional rubber mill or in any suitable mixing device and the resulting admixture is cured in the mold at an elevated temperature, e.g., from about 125°–160° C., in a relatively short period, e.g., a few minutes, or longer. In the mold, the cure is accomplished apparently by a reaction of excess amino or hydroxyl groups with the newly admixed polyisocyanate, and secondly by reaction of the remaining free terminal isocyanate groups with hydrogen atoms of the urea and urethane groups to form a crosslinked resin. By this procedure, there can be obtained cured polyurethane products which range from highly elastomeric materials possessing excellent tensile strength and exceptional low brittle temperature to tough, rigid rubber materials.

Various modifying agents can be added to the castable or curable formulations among which can be listed fillers such as carbon blacks, various clays, zinc oxide, titanium dioxide, and the like; various dyes; plasticizers such as polyesters which do not contain any reactive end-groups, stearic and other fatty acids, organic esters of stearic and other fatty acids, metal salts of fatty acids, dioctyl phthalate, tetrabutylthiodisuccinate, and the like.

Also encompassed within the scope of the third and fourth embodiments are the use of HOH and polycarboxylic acids such as the dicarboxylic acids illustrated previously, in lieu of, or in conjunction with, the polyfunctional compounds. This modification results in the production of a foamed product.

In addition, modifications of the cast polyurethane embodiments include the use of polyisocyanates having 3 or more isocyanato groups in lieu of, or in conjunction with, the diisocyanate compound.

The preparation of 4-nitro-4-hydrocarbyloxymethyl-2,6-dioxacyclohexanone or 4-nitro-4-acyloxymethyl-2,6-dioxacyclohexanone, etc., is effected by the following sequence of steps:

(1) 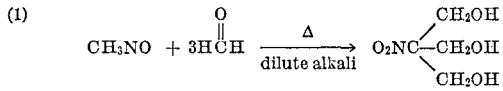

Equation 1 supra represents an aldol-like condensation reaction which can be conducted in the presence of a basic catalyst, e.g., a dilute alkali metal hydroxide solution, at a moderately elevated temperature. The product, i.e., tris-(hydroxymethyl)-nitromethane, is then contacted with a hydrocarbyl halide or an acyl halide which is designated as R"X in Equation 2 below:

(2) 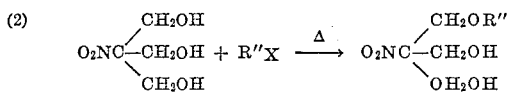

The resulting monoetherified product or monoesterified product, as may be the case, then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

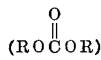

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_3$ and $Y_4TiO_4$ in which the Y's are alkyl aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3) 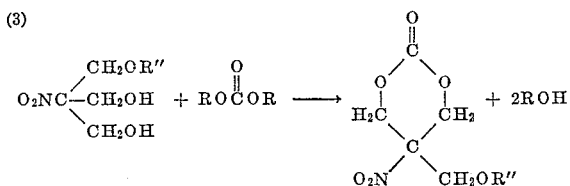

The R" radical in Equation 3 above is hydrocarbyl or acyl.

The preparation of 4-tertiary amino-4-hydrocarbyloxymethyl-2,6-dioxacyclohexanone or 4-tertiary amino-4-acyloxymethyl-2,6-dioxacyclohexanone can be accomplished by contacting the monoetherified product of monoesterified product of Equation 2 supra with hydrogen, in the presence of conventional hydrogenation catalysts, e.g., Raney nickel, platinum, and the like, at an elevated temperature, followed by alkylation of the resulting primary amino group (—$NH_2$) with, for example, a stoichiometric quantity of a hydrocarbyl halide, preferably in the presence of a base, e.g., an alkali metal hydroxide, to thus convert said —$NO_2$ group to a tertiary amino group, i.e., (4) 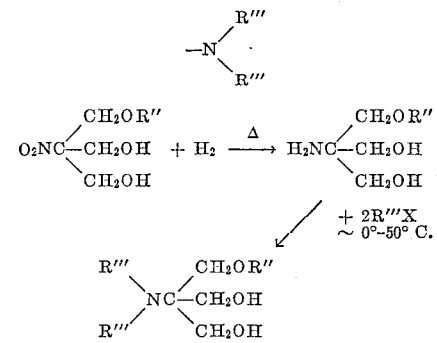

The resulting tertiary amino compounds are readily cyclized to the corresponding carbonates by following the procedure shown in Equation 3 supra.

The 4-nitro-4-hydrocarbyl-2,6-dioxacyclohexanones and 4-t-amino-4-hydrocarbyl-2,6-dioxacyclohexanones, can be prepared by the reaction of a hydrocarbyl substituted nitromethane, i.e, $RCH_2NO_2$ wherein R is an alkyl, aryl, cycloalkyl, aralkyl, alkaryl, etc., with an excess of formaldehyde, as shown in the following equation:

(5)
$$RCH_2NO_2 + 2HCH \longrightarrow R-C \begin{matrix} CH_2OH \\ | \\ NO_2 \end{matrix} CH_2OH$$

The resulting 2-nitro-2-hydrocarbyl-1,3-propanediol compound in Equation 5 then can be subjected to the cyclization step illustrated in Equation 3 supra, or it can undergo the sequence of steps illustrated in Equation 4, thus producing the corresponding various nitro and tertiary amino substituted carbonates.

The preparation of 4,4-di(hydrocarbyl)-2,6-dioxacyclohexanone is accomplished by an aldol condensation of the appropriate aldehyde which contains one alpha hydrogen atom, with formaldehyde, followed by a Cannizzaro reaction with additional formaldehyde. Equation 6 depicts the over-all reaction:

(6)
$$R-CH-CHO + 2HCH \longrightarrow R-C-CH_2OH$$
with R substituents

Both R's in Equation 6 represent hydrocarbyl groups. The resulting 2,2-di(hydrocarbyl)-1,3-propanediol then can be subjected to the cyclization step discussed in Equation 3 to yield 4,4-di(hydrocarbyl)-2,6-dioxacyclohexanone.

The preparation of 4-hydrocarbyl-4-hydrocarbyloxymethyl-2,6-dioxacyclohexanone or 4-hydrocarbyl-4-acyloxymethyl-2,6-dioxacyclohexanone is conveniently prepared by employing an aldehyde which contains two alpha hydrogen atoms in Equation 6 supra, that is:

(7)
$$R-CH_2CHO + 3HCH \longrightarrow R-C \begin{matrix} CH_2OH \\ - CH_2OH \\ CH_2OH \end{matrix}$$

The resulting 1-hydrocarbyl-1,1,1-trimethylolmethane then can be reacted with R"X of Equation 2 supra, followed by the cyclization step of Equation 3 to obtain the cyclic carbonate under consideration.

The 4,4-di(hydrocarbyloxymethyl) - 2,6-dioxacyclohexamones or 4,4-di(acyloxymethyl) - 2,6 - dioxacyclohexanones are prepared by the reaction of pentaerythritol with sufficient R"X (note Equation 2) to produce the diether or diester of pentaerythritol which, in turn, can be cyclized (note Equation 3) to yield the corresponding carbonates. Equation 8 below illustrates the over-all reaction.

(8)

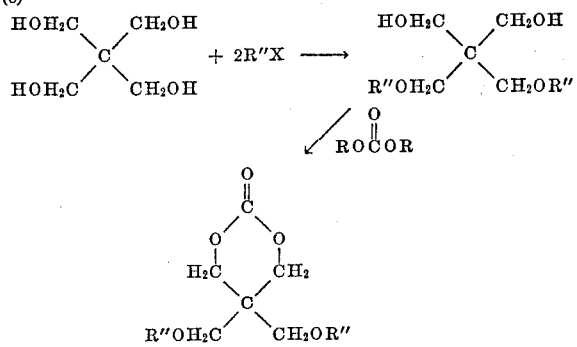

The 4-substituted-4-cyanoalkoxymethyl-2,6-dioxacyclohexanones wherein the 4-substituted moiety is hydrocarbyl, nitro, or tertiary amino such as those illustrated previously can be prepared by reacting a molar excess of 1-hydrocarbyl-1,1,1-trimethylolmethane or 1-nitro-1,1,1-trimethylolmethane with an alpha,beta-unsaturated nitrile such as the 2-alkenenitriles, e.g., acrylonitrile, and then cyclizing the 2-substituted - 2-cyanoalkoxy-methyl-1,3-propanediol to the corresponding carbonate. The nitro group ($-NO_2$) of the 2-nitro-2-cyanoalkoxymethyl-1,3-propanediols can be hydrogenated to the amino group ($-NH_2$), followed by alkylating the $-NH_2$ group to the tertiary amino-2-cyanoalkoxymethyl - 1,3-propanediols to the 4-tertiary amino - 4-cyanoalkoxymethyl - 2,6-dioxacyclohexanones. The 4,4-di(cyanoalkoxymethyl) - 2,6-dioxacyclohexanones prepared by reacting one mol of pentaerythritol with two mols of 2-alkenenitrile, e.g., acrylonitrile, to yield 2,2-di(cyanoalkoxymethyl) - 1,3-propanediol, followed by cyclizing to produce the subject carbonate.

The various 3- and/or 4- and/or 5-hydrocarbyl-2,6-dioxacyclohexanones can be prepared by cyclizing the appropriate mono-, di-, or trisubstituted 1,3-propanediol to produce the corresponding cyclic carbonate.

The 4,4-di(halomethyl)-2,6-dioxacyclohexanones such as 4,4-di(chloromethyl)-2,6-dioxacyclohexanone can be prepared by cyclizing pentaerythritol dichloride with dialkyl carbonate; 2,2-di(cyanomethyl)-2,6-dioxacyclohexanone can be prepared by reacting one mol of pentaerythritol dichloride with two mols of an alkali metal cyanide to thus yield the 2,2-di(cyanomethyl)-1,3-propanediol which, in turn, can be cyclized to give the subject carbonate; 3-chloromethyl - 2,6-dioxacyclohexanone and 3-cyanomethyl - 2,6 - dioxacyclohexanone prepared by cyclizing 4-chloro-1,3-butanediol and 4-cyano-1,3-butanediol, respectively.

The advantages and utility of the method and products of the invention will become further apparent from the following detailed examples included for illustrative purposes only and showing the best mode contemplated at present for carrying out the invention.

In the following illustrative examples, the phrase "part(s) by weight" has been abbreviated to the term "part(s)."

Example 1

A polycarbonate is prepared by reacting 7.4 parts of n-butanol, 114 parts of epsilon-caprolactone, 39 parts of 4,4-dimethyl-2,6-dioxacyloclohexanone, and 0.05 part of stannous dioctanoate catalyst at 150° C. for a period of 6 hours. The resulting polycarbonate has a hydroxyl number of 34.6, and a molecular weight of about 1600. The polycarbonate is terminated with n-butyl and hydroxyl groups.

Example 2

A polycarbonate is prepared by reacting 7.4 parts of n-butanol, 114 parts of epsilon-caprolactone, 39 parts of 4,4-dimethyl - 2,6-dioxacyclohexanone, and 0.1 part of tetraisopropyl titanate catalyst at 160° C. for a period of 4 hours. The resulting polycarbonate has a hydroxyl number of 34.4, and a molecular weight of about 1600. One hundred grams of the above polycarbonate is reacted with 30 grams of acetic anhydride at 100° C. for a period of 5 hours. Excess anhydride and acetic acid are removed via distillation under reduced pressure. The polycarbonate is terminated with n-butyl and acetyl groups.

Example 3

A polycarbonate is prepared by reacting 126 parts of 2-ethylhexanol, 998 parts of epsilon-caprolactone, 260 parts of 4,4-dimethyl - 2,6-dioxacyclohexanone, and 0.2 part of lead 2-ethylhexanonate catalyst at 150° C. for a period of 8 hours. The resulting polycarbonate has a hydroxyl number of 40.5, and a molecular weight of about 1400. Two hundred grams of the above polycarbonate is reacted with 50 grams of acetic anhydride at 80° C. for a period of 6 hours. Excess anhydride and acetic acid are removed via distillation under reduced pressure.

Example 4

A polycarbonate is prepared by reacting 126 parts of 2-ethylhexylamine, 228 parts of epsilon-caprolactone, 260 parts of 4,4-dimethyl-2,6-dioxacyclohexanone, and 0.2 part of tetrabutyl titanate catalyst at 150° C. for a period of 4 hours. The resulting polycarbonate has a hydroxyl number of 91.0, and a molecular weight of about 600. Two hundred grams of the above polycarbonate is reacted with 50 grams of acetic anhydride at 100° C. for a period of 4 hours. Excess anhydride and acetic acid are removed via distillation under reduced pressure.

Example 5

A polycarbonate is prepared by reacting 45 parts of ethylamine, 640 parts of a mixture of methyl-substituted epsilon-caprolactones, 260 parts of 4,4-dimethyl-2,6-dioxacyclohexanone, and 0.2 part of stannic tetraacetate catalyst at 140° C. for a period of 8 hours. The resulting polycarbonate has a hydroxyl number of 59.5, and a molecular weight of about 950. Two hundred grams of the above polycarbonate is reacted with 50 grams of acetic anhydride at 100° C. for a period of 5 hours. Excess anhydride and acetic acid are removed via distillation under reduced pressure.

Example 6

A polycarbonate is prepared by reacting 134 parts of dipropylene glycol, 228 parts of epsilon-caprolactone, 130 parts of 4,4-dimethyl-2,6-dioxacyclohexanone, and 0.2 part of dibutyltin oxide catalyst at 150° C. for a period of 4 hours. The resulting polycarbonate has a hydroxyl number of 221, and a molecular weight of about 500. Two hundred grams of the above polycarbonate is reacted with 100 grams of 2-ethylhexanoic acid at 150° C. for a period of 4 hours while water of reaction is removed via distillation. Excess 2-ethylhexanoic acid is removed via distillation. The resulting 2-ethylhexanoate ester of the above polycarbonate is obtained in essentially quantitative yield.

Example 7

A polycarbonate is prepared by reacting 76 parts of isopropanolamine, 1140 parts of epsilon-caprolactone, 520 parts of 4,4-dimethyl-2,6-dioxacyclohexanone, and 0.2 part of dibutyltin dilaurate catalyst at 140° C. for a period of 10 hours. The resulting polycarbonate has a hydroxyl number of 66, and a molecular weight of about 1700. Two hundred grams of the above polycarbonate is esterified with 50 grams of propionic anhydride at 80° C. for a period of 6 hours. Excess anhydride and propionic acid are removed via distillation under reduced pressure.

Example 8

A polycarbonate is prepared by reacting 116 parts of hexamethylenediamine, 1710 parts of epsilon-caprolactone, 650 parts of 4,4-dimethyl-2,6-dioxacyclohexanone, and 0.3 part of zinc acetate catalyst at 150° C. for a period of 10 hours. The resulting polycarbonate has a hydroxyl number of 46.8, and a molecular weight of about 2400. Two hundred grams of the above polycarbonate is reacted with 50 grams of mono-(2-ethylhexyl) adipate at 150° C. for a period of 4 hours while the resulting water of reaction is removed via distillation. Remaining volatile materials are removed via distillation at 100° C. and 1–2 mm. Hg. The resulting product contains less than 0.2 percent free hydroxyl.

Example 9

A polycarbonate is prepared by reacting 122 parts of an 80:20 mixture of 2,4- and 2,6-toluenediamines, 1710 parts of epsilon-caprolactone, 290 parts of 4,4-dimethyl-2,6-dioxacyclohexanone, and 0.2 part of stannic tetrachloride catalyst at 120° C. for a period of 8 hours. The resulting polycarbonate has a hydroxyl number of 53.5, and a molecular weight of about 2100. Two hundred grams of the above polycarbonate is etherified by reacting with 25 grams of dimethyl sulfate and 400 milliliters of 2 N methanolic KOH at 60° C. The resulting potassium sulfate is removed by filtration and, subsequently, methanol is removed via distillation. The resulting etherified polycarbonate contains less than 0.2 percent free hydroxyl groups.

Example 10

A polycarbonate is prepared by reacting 13.8 parts of pentaerythritol, 570 parts of epsilon-caprolactone, 128 parts of a mixture of methyl-substituted epsilon-caprolactones, 130 parts of 4,4-dimethyl-2,6-dioxacyclohexanone, and 0.3 part of dibutyltin oxide catalyst at 160° C. for a period of 8 hours. The resulting polycarbonate has a hydroxyl number of 26.8, and a molecular weight of about 8400. Two hundred grams of the above polycarbonate is etherified by reacting with 12.6 grams of benzyl chloride in the presence of 100 milliliters of 2 N methanolic KOH at 80° C. for a period of 2 hours. The resulting potassium chloride is removed via filtration and methanol is removed by distillation. The residue product, namely, the etherified polycarbonate contains less than 0.25 percent free hydroxyl groups.

Example 11

A polycarbonate is prepared by reacting 10.3 parts of diethylenetriamine, 342 parts of epsilon-caprolactone, 150 parts of a mixture of dimethyl-substituted epsilon-caprolactone, 102 parts of 2,6-dioxacyclohexanone, and 0.2 part of dibutyltin oxide catalyst at 160° C. for a period of 8 hours. The resulting polycarbonate has a hydroxyl number of 28.0, and a molecular weight of about 6000.

Example 12

(A) A polycarbonate is prepared by reacting 62 parts of ethylene glycol, 1140 parts of epsilon-caprolactone, 300 parts of 4-methyl-4-nitro-2,6-dioxacyclohexanone, and 0.2 part of di-2-ethylhexyltin oxide catalyst at 125° C. for a period of 8 hours. The resulting polycarbonate has a hydroxyl number of 74.0, and a molecular weight of about 1500.

(B) A hydroxyl-terminated polycarbonate-urethane reaction product is prepared by reacting 450 parts of the above polycarbonate and 37.4 parts of an 80:20 mixture of 2,4- and 2,6-toluene diisocyanates at a temperature of 70–80° C. for a period of 2 hours. The resulting reaction product has a hydroxyl number of 23.4.

(C) An isocyanate-terminated polycarbonate-urethane reaction product is prepared by reacting 150 parts of the polycarbonate exemplified in Example 12A, and 50 parts of diphenylmethane diisocyanate, at a temperature of 80° C. for a period of 3 hours. The resulting product has an NCO-content of 4.1 percent.

(D) A cast elastomeric reaction product is prepared by reacting 100 parts of the isocyanate-terminated polymer described in C above with 11 parts of 4,4'-bis(o-chloroaniline) at 120° C. for a period of 3 hours. The resulting elastomeric product exhibits high tensile strength and excellent resistance to hydrocarbon solvents.

Three additional elastomeric reaction products of high tensile strength, high elongation and excellent solvent resistance are also obtained by reacting 100 parts of said isocyanate-terminated prepolymer with (a) 3.6 parts of 1,4-butanediol, (b) 4.47 parts of trimethylol propane, and (c) 4.5 parts of quinitol and subjecting said cast polyurethane resins to a temperature of 100° C. for 20 hours to effect efficient cure.

Example 13

(A) A polycarbonate is prepared by reacting 62 parts of ethylene glycol, 1140 parts of epsilon-caprolactone, 420 parts of 4-ethyl-4-cyanoethoxymethyl-2,6-dioxacyclohexanone, and 0.2 part of stannous dioleoate catalyst at 140° C. for a period of 8 hours. The resulting polycarbonate has a hydroxyl number of about 70.2, and a molecular weight of about 1600.

(B) A hydroxyl-terminated polycarbonate urethane reaction product is prepared by reacting 160 parts of the above polycarbonate and 8.7 parts of 2.4-toluene diisocyanate at a temperature of 70–80° C. for a period of 2 hours. The resulting reaction product has a hydroxyl number of 33.0.

(C) An isocyanate-terminated polycarbonate-urethane reaction product is prepared by reacting 160 parts of the polycarbonate exemplified in Example 13A, and 37.4 parts of an 80:20 mixture of 2,4- and 2,6-toluene diisocyante, at a temperature of 80° C. for a period of 3 hours. The resulting product has an NCO-content of 4.15 percent.

(D) A cast elastomeric reaction product is prepared by reacting 100 parts of the isocyante-terminated polymer described in C above with 11 parts of 4,4'-methylene bis (o-chloroaniline) at 100° C. for a period of 4 hours. The resulting elastomeric product exhibits high tensile and tear strength and excellent resistance to hydrocarbon solvents.

Example 14

(A) A polycarbonate is prepared by reacting 62 parts of ethylene glycol, 1140 parts of epsilon-caprolactone, 187 parts of 4,4-di(chloromethyl)-2,6-dioxacyclohexanone, and 0.4 part of dibutyltin dimaleate catalyst at 140° C. for a period of 8 hours. The resulting polycarbonate has a hydroxyl number of 83.2, and molecular weight of about 1350.

(B) A hydroxyl-terminated polycarbonate-urethane reaction product is prepared by reacting 405 parts of the above polycarbonate and 37.6 parts of para-xylylene diisocyanate at a temperature of 70–80° C. for a period of 2 hours. The resulting reaction product has a hydroxyl number of 25.5.

(C) An isocyanate-terminated polycarbonate-urethane reaction product is prepared by reacting 135 parts of the polycarbonate exemplified in Example 14A, and 38 parts of p-xylylene diisocyanate, at a temperature of 90° C. for a period of 3 hours. The resulting product has an NCO-content of 4.8 percent.

(D) An elastomeric reaction product is prepared by reacting 100 parts of the isocyanate-terminated polymer described in C above with 6.9 parts of meta-xylenediamine at 100° C. for a period of 3 hours. The resulting elastomeric product exhibits high tensile and tear strength and excellent stability to sunlight.

Example 15

(A) A polycarbonate is prepared by reacting 6.2 parts of ethylene glycol, 195 parts of 4,4-dimethyl-2,6-dioxacyclohexanone, and 0.1 part of stannous dioctanoate catalyst at 120° C. for a period of 10 hours. The resulting polycarbonate has a hydroxyl number of 56.0, and a molecular weight of about 2000.

(B) An isocyante-terminated polycarbonate-urethane reaction product is prepared by reacting 200 parts of the above polycarbonate and 38 parts of a mixture 2,4- and 2,6-toluene diisocyanates, at a temperature of 90° C. for a period of 3 hours. The resulting prepolymer has an NCO-content of 3.5 percent.

Example 16

(A) A polycarbonate is prepared by reacting 6.2 parts of ethylene glycol, 195 parts of 4,4-dimethyl-2,6-dioxacyclohexanone, 54 parts of 4,4-di(cyanomethyl)-2,6-dioxacyclohexanone, and 0.1 part of stannous dioctanoate catalyst at 130° C. for a period of 6 hours. The resulting polycarbonate has a hydroxyl number of 45.0, and a molecular weight of about 2500.

(B) An isocyanate-terminated polycarbonate-urethane reaction product is prepared by reacting 75 parts of the above polycarbonate, and 7 parts of 2,4-toluene diisocyanate, at a temperature of 100° C. for a period of 2 hours. The resulting product has an NCO-content of 1.0 percent and a molecular weight of about 8000.

Example 17

(A) A polycarbonate is prepared by reacting 6.2 parts of ethylene glycol, 160 parts of epsilon-caprolactone, 40 parts of 3-methyl-2,6-dioxacyclohexanone, and 0.2 part of stannous octoate catalyst at 140° C. for a period of 8 hours. The resulting polycarbonate has a hydroxyl number of 59, and a molecular weight of about 1900. The polycarbonate is terminated with hydroxyl groups.

(B) An isocyanate-terminated polycarbonate-urethane reaction product is prepared by reacting 190 parts of the above polycarbonate and 39.5 parts of hexamethylene diisocyanate, at a temperature of 100° C. for a period of 4 hours. The resulting prepolymer has an NCO-content of 3.6 percent.

Example 18

(A) A polycarbonate is prepared by reacting 136 parts of 1,2,6-hexanetriol, 1000 parts of epsilon-caprolactone, 200 parts of 3-chloromethyl-2,6-dioxacyclohexanone, and 0.1 part of sulfuric acid catalyst at 80° C. for a period of 6 hours. The resulting polycarbonate has a hydroxyl number of 125, and a molecular weight of about 1350. The polycarbonate is terminated with hydroxyl groups.

(B) An isocyanate-terminated polycarbonate-urethane reaction product is prepared by reacting 135 parts of the above polycarbonate, and 105 parts of an 80:20 mixture of 2,4- and 2,6-toluene diisocyanates, at a temperature of 80° C. for a period of 3 hours. The resulting prepolymer which contains free toluene diisocyanate has an NCO-content of 15.5 percent.

Example 19

(A) A polycarbonate is prepared by reacting 53.06 parts of diethylene glycol, 758 parts of epsilon-caprolactone, 189.4 parts of 4,4-dimethyl-2,6-dioxacyclohexanone, and 0.05 part of tetraisopropyl titanate catalyst at 175° C. for a period of 7.5 hours. The resulting polycarbonate has a hydroxyl number of 61.4, a carboxyl number of 0.07, and a molecular weight of about 1820. The polycarbonate is terminated with hydroxyl groups.

(B) An isocyanate-terminated polycarbonate-urethane reaction product is prepared by reacting 890 parts of the above polycarbonate, and 174.4 parts of an 80:20 mixture of 2,4- and 174.4 parts of an 80:20 mixture of 2,4- nd 2,6-toluene diisocyanate, at a temperature of 80–85° C. for a period of 3 hours under an atmosphere of nitrogen. The resulting prepolymer has an NCO-content of 3.87 percent.

(C) A cast elastomeric reaction product is prepared by reacting 200 parts of the isocyanate-terminated polymer described in C above with 22.39 parts of 4,4'-methylenebis(o-chloroaniline) at 100° C. for a period of 20 hours. The resulting elastomeric product exhibits the following physical characteristics:

Tensile strength, p.s.i. _____ 4890
Elongation, percent _____ 489
Hardness, Shore D _____ 37

Example 20

A polycarbonate is prepared by reacting 30.7 parts of glycerol, 679 parts of epsilon-caprolactone, 291 parts of 4,4-dimethyl-2,6-dioxacylohexanone, and 0.05 part of tetraisopropyl titanate catalyst at 175–200° C. for a period of 7 hours. The resulting polycarbonate has a hydroxyl number of 61.8, a carboxyl number of 0.5, and a molecular weight of about 2680. The polycarbonate is terminated with hydroxyl groups.

Example 21

(A) A polycarbonate is prepared by reacting 60.1 parts of ethylenediamine, 752 parts of epsilon-caprolactone, 188 parts of 4,4-dimethyl-2,6-dioxyacyclohexanone, and 0.05 part of tetraisopropyl titanate catalyst at 175° C. for a period of 6.5 hours. The resulting polycarbonate has a hydroxyl number of 102.6, a carboxyl number of 0.48, and a molecular weight of about 1080. The polycarbonate is terminated with hydroxyl groups.

(B) An isocyanate-terminated polycarbonate-urethane reaction product is prepared by reacting 808 parts of the above polycarbonate, 221 parts of a mixture of 2,4- and 2,6-toluene diisocyanates, containing 0.07 part of adipyl chloride retarder at a temperature of 80–85° C. for a period of 3 hours under an atmosphere of nitrogen. The resulting product has an NCO-content of 4.22 percent.

(C) A cast elastomeric reaction product is prepared by reacting 200 parts of the isocyanate-terminated prepolymer described in B above with 11.65 parts of triisopropanolamine at 100° C. for a period of 20 hours. The resulting elastomeric product exhibits the following physical characteristics:

Tensile strength, p.s.i. _____ 3180
Elongation, percent _____ 410
Hardness, Shore A _____ 72

(D) A cast elastomeric reaction product is prepared by reacting 200 parts of the afore-mentioned isocyanate-terminated prepolymer described in B above with 24.41 parts of 4,4'-methylenebis(o-chloroaniline) at 100° C. for a period of 20 hours. The resulting elastomer product exhibits the following physical characteristics:

Tensile strength, p.s.i. _____ 3260
Elongation, percent _____ 400
Hardness, Shore D _____ 43

Example 22

(A) A polycarbonate is prepared by reacting 106 parts of diethylene glycol, 750 parts of epsilon-caprolactone, 144 parts of 4,4-dimethyl-2,6-dioxacyclohexanone, and 0.05 part of stannous octoate catalyst at 150° C. for a period of 6 hours. The resulting polycarbonate has a hydroxyl number of 111.6, and a molecular weight of about 1000. The polycarbonate is terminated with hydroxyl groups.

(B) An isocyanate-terminated polycarbonate-urethane reaction product is prepared by reacting 500 parts of the above polycarbonate and 250 parts of diphenylmethane diisocyanate at a temperature of 70° C. for a period of 3 hours. The resulting product has an NCO-content of 5.5 percent.

(C) A thermoplastic polyurethane resin is prepared by reacting 500 parts of the prepolymer described in B above and 37 parts of 1,6-hexanediol at a temperature of 100° C. in a Baker-Perkins mixer for a period of 1 hour. After removal from the mixer the product is further heated at 100° C. for a period of 5 hours. The resulting thermoplastic polyurethane resin has high tensile strength and elongation and is soluble in methylethyl ketone, methylene chloride, and other solvents.

(D) A crosslinked polyurethane resin is prepared by admixing 100 parts of the above thermoplastic polyurethane resin described in C above with 3 parts of triphenylmethane triisocyanate at 70° C. on a two-roll rubber mill. A portion of the resulting compounded gun is then molded into a disc of ⅛" thickness by subjecting said gum to a curing temperature of 150° C. for a period of 15 minutes in a conventional sample mold under a pressure of 1000 p.s.i. After standing at room temperature for a period of 7 days the resulting cured elastomer exhibits excellent tensile strength, high elongation, and is not affected to any significant extent by aliphatic and aromatic hydrocarbons.

Example 23

(A) A polycarbonate is prepared by reacting 106 parts of diethylene glycol, 570 parts of epsilon-caproalctone, 260 parts of 4,4-dimethyl-2,6-dioxacyclohexanone, and 0.1 part of tetrabutyltitanate at 150° C. for a period of 6 hours. Thereafter, 144 parts of adipic acid, and 500 milliliters of toluene are added and a total of 35 parts of water of reaction is removed from said mixture by azeotropic distillation over a period of 6 hours at a pot temperature of 150° C. Toluene is removed via distillation and the reaction product is subjected to a vacuum of 10 mm. Hg at 100° C. for a period of 1 hour. The resulting hydroxyl-terminated polycarbonate has a hydroxyl number of 57.5, a carboxyl number of 0.3, and a molecular weight of about 1950.

(B) An isocyanate-terminated prepolymer is prepared by reacting 195 parts of the above prepolymer and 38 parts of an 80:20 mixture of 2,4- and 2,6-toluene diisocyanates for 2 hours at a temperature of 80° C. The resulting prepolymer has an NCO-content of 3.6 percent.

Example 24

(A) A polycarbonate is prepared by reacting 62 parts of ethylene glycol, 650 parts of epsilon-caprolactone, 250 parts of 4,4-dimethyl-2,6-dioxacyclohexanone, and 0.2 part of tetraisopropyltitanate at 150° C. for a period of 6.5 hours. Thereafter, 148 parts of phthalic anhydride, and 500 milliliters of toluene are added and a total of 17 parts of water of reaction is removed from said mixture by azeotropic distillation over a period of 4 hours at a pot temperature of 150° C. Toluene is removed via distillation and the reaction product is subjected to a vacuum of 8 mm. Hg for a period of 30 minutes. The resulting hydroxyl-terminated polycarbonate has a hydroxyl number of 56.7, a carboxyl number of 0.25, and a molecular weight of about 2000.

(B) An isocyanate-terminated prepolymer is prepared by reacting 200 parts of the above polycarbonate with 50 parts of diphenylmethane diisocyanate at 70° C. for a period of 1 hour. The resulting prepolymer has a free NCO-content of 3.35 percent.

In the preceding examples, the following were measured accordingly:

Tensile strength is measured according to ASTM D 412–61 T (Die C).
Elongation is measured according to ASTM D 412–61 T (Die C).
Tear strength is measured according to ASTM D 624.
Solvent resistance is measured according to ASTM D 471–59 T.
Hardness (Shore A and D) is measured according to ASTM D 676–58 T.
Sunlight resistance is determined according to AATCC Standard Test Method 16A (1960).

What is claimed is:
1. A process for the production of hydroxy-containing products having an average molecular weight of from about 300 to about 9,000 which comprises (1) heating at least one cyclic carbonate of the formula

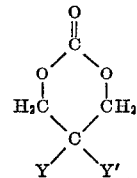

wherein Y is hydrogen, nitro, or a monovalent radical free from ethylenic and acetylenic unsaturation which is selected from the group consisting of hydrocarbyl, hydrocarbyloxymethyl, acyloxymethyl, and the unit

each $R_1$ being hydrocarbyl; and wherein Y' is hydrogen or a monovalent radical free from ethylenic and acetylenic unsaturated which is selected from the group consisting of hydrocarbyl, hydrocarbyloxymethyl, and acyloxymethyl; (2) with at least one organic functional initiator selected from the group consisting of carboxy-containing compounds, hydroxy-containing compounds, amino-containing compounds, and mixtures thereof; (3) to a temperature in the range of from about 50° C. to about 225° C.; (4) the concentration of said cyclic carbonate and said initiator being sufficient so as to provide a ratio of at least two mols of said cyclic carbonate per mol of reactive hydrogen substituent on said initiator; and (5) for a period of time sufficient to produce said hydroxy-containing products.

2. The hydroxyl products prepared by the process of claim 1.

3. A process which comprises (1) contacting an admixture containing a cyclic carbonate as defined in claim 1, with an organic difunctional initiator of the group consisting of glycols, diamines, and amino alcohols, said admixture being in molar excess with relation to said initiator, at a temperature of from about 50° C. to about 225° C., for a period of time to produce dihydroxyl-terminated polycarbonate products; and (2) thereafter contacting said dihydroxyl-terminated polycarbonate products with a molar deficiency of a dicarboxylic acid, at a temperature in the range of from about 125° C. to about 250° C. to thus produce chain extended dihydroxyl-terminated polycarbonate products.

4. The chain extended dihydroxyl-terminated polycarbonate products prepared by the process of claim 3.

5. A process which comprises (1) contacting an admixture containing a cyclic carbonate as defined in claim 1, with an organic difunctional initiator of the group consisting of glycols, diamines, and amino alcohols, said admixture being in molar excess with relation to said initiator, at a temperature of from about 50° C. to about 225° C., for a period of time to produce dihydroxyl-terminated polycarbonate products; and (2) thereafter contacting said dihydroxyl-terminated polycarbonate products with a molar excess of a dicarboxylic acid, at a temperature in the range of from about 125° C. to about 250° C. to thus produce chain extended dicarboxyl-terminated polycarbonate products.

6. The chain-extended dicarboxyl-terminated polycarbonate products prepared by the process of claim 5.

7. A process for the production of polyhydroxy products having an average molecular weight of from about 300 to about 9,000 which comprises (1) heating at least one cyclic carbonate or an admixture containing a cyclic carbonate and a cyclic ester; (2) said cyclic carbonate having the Formula I below I
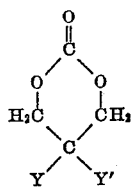

wherein Y is hydrogen, nitro, or a monovalent radical free from ethylenic and acetylenic unsaturation which is selected from the group consisting of hydrocarbyl, hydrocarbyloxymethyl, acyloxymethyl, and the unit

each $R_1$ being hydrocarbyl; and wherein Y' is hydrogen or a monovalent radical free from ethylenic and acetylenic unsaturation and of the group consisting of hydrocarbyl, hydrocarbyloxymethyl, and acyloxymethyl; (3) said cyclic ester having the Formula II below II
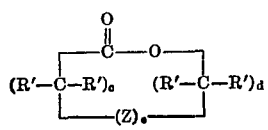

wherein each R', individually, is of the group consisting of hydrogen, alkyl, halo, haloalkyl, alkoxyalkyl, and alkoxy; wherein Z is of the group consisting of oxy and the unit

the R' variables of the aforesaid unit having the same values as above; wherein c is an integer of from 1 to 4; wherein d is an integer of from 1 to 4; and wherein e is an integer having a value of zero or one; with the provisos that in Formula II having (a) the some of $a+b+c$ cannot equal three, (b) the R' variables do not exceed three, and (c) the carbon atom adjacent to the oxy atom contains at least one hydrogen substituent thereon; (4) with at least one organic polyfunctional initiator selected from the group consisting of polycarboxy-containing compounds, polyhydroxy-containing compounds, polyamino-containing compounds and mixtures thereof; (5) to a temperature in the range of from about 50° C. to about 225° C.; (6) the molar ratio of said admixture to said initiator being at least about 2; and (7) for a period of time sufficient to produce said polyhydroxy products.

8. The process of claim 7 wherein said cyclic ester is an epsilon-caprolactone.

9. The polyhydroxyl products prepared by the process of claim 8.

10. The process of claim 8 wherein said cyclic carbonate is an alkyl substituted 2,6-dioxacyclohexanone.

11. The polyhydroxyl products prepared by the process of claim 10.

12. The process of claim 8 wherein said cyclic carbonate is 4,4-dialkyl-2,6-dioxacyclohexanone.

13. The polyhydroxyl products prepared by the process of claim 12.

14. The process of claim 8 wherein said cyclic carbonate is 4,4-di(cyanoalkyl)-2,6-dioxacyclohexanone.

15. The polyhydroxyl products prepared by the process of claim 14.

16. The process of claim 8 wherein said cyclic carbonate is 4,4-di(haloalkyl)-2,6-dioxacyclohexanone.

17. The polyhydroxyl products prepared by the process of claim 16.

18. The process of claim 7 wherein said cyclic carbonate is 4,4 - dimethyl - 2,6-dioxacyclohexanone and wherein said cyclic ester is epsilon-carprolactone.

19. The polyhydroxyl products prepared by the process of claim 18.

20. The polyhydroxyl products prepared by the process of claim 7.

21. A polyurethane prepared by the process which comprises reacting (a) an isocyanate-terminated prepolymer which is obtained by the reaction of (i) an excess of an organic diisocyanate with (ii) the dihydroxyl-containing products of claim 20, with (b) a polyfunctional chain-extender which contains at least two functional groups selected from the group consisting of hydroxyl, primary amino, secondary amino groups, and mixtures thereof, (c) at a temperature of from about room temperature to about 200° C.

22. Cast polyurethane product prepared by the process which comprises reacting (a) an isocyanate-terminated prepolymer having an average molecular weight of at least about 650 to 8,000 which is obtained by the reaction of (i) an excess of an organic diisocyanate with (ii) the dihydroxyl-containing products of claim 20, with (b) a polyfunctional chain-extender which contains at least two functional groups selected from the group consisting of hydroxyl, primary amino, and secondary amino groups, and mixtures thereof, (c) at a temperature of from about room temperature to about 200° C. (d) the concentration of said prepolymer and said polyfunctional chain-extender being sufficient so as to provide a ratio of from about 1.02 to about 1.3 equivalents of NCO groups from the prepolymer per equivalent of functional group from the polyfunctional chain-extender.

23. Thermoplastic polyurethane resins prepared by the process which comprises reacting (a) an isocyanate-terminated prepolymer having an average molecular weight of at least about 650 to 8,000 which is obtained by the reaction of (i) an excess of an organic diisocyanate with (ii) the dihydroxyl-containing products of claim 20, with (b) a polyfunctional chain-extender which contains at least two functional groups selected from the group consisting of hydroxyl, primary amino, and secondary amino groups, and mixtures thereof, (c) at a temperature of from about room temperature to about 200° C. (d) the concentration of said prepolymer and said polyfunctional chain-extender being sufficient so as to provide a ratio of at least about one to about 1.5 equivalents of functional group from said polyfunctional chain-extender per equivalent of NCO group from said prepolymer.

24. Cured polyurethane products prepared by reacting from about 1 to about 10 parts by weight of additional polyisocyanate per 100 parts by weight of the thermoplastic polyurethane resins defined in claim 23.

References Cited

UNITED STATES PATENTS

| 2,448,767 | 9/1948  | Carlson          | 260—284  |
| 2,787,632 | 4/1957  | Stevens          | 260—463  |
| 3,110,686 | 11/1963 | Newton           | 260—2.5  |
| 3,301,824 | 1/1967  | Hostettler et al. | 260—77.5 |
| 3,305,605 | 2/1967  | Hostettler et al. | 260—873  |

DONALD E. CZAJA, Primary Examiner.

F. McKELVEY, Assistant Examiner.